US009650078B2

(12) United States Patent
Kinsman et al.

(10) Patent No.: US 9,650,078 B2
(45) Date of Patent: May 16, 2017

(54) SIDE-BY-SIDE ALL TERRAIN VEHICLE

(75) Inventors: Anthony J. Kinsman, Wyoming, MN (US); Angus M. Morison, Blaine, MN (US); Keith A. Hollman, Osceola, WI (US); Adam J. Schlangen, Rush City, MN (US); Shawn D. Peterson, East Bethel, MN (US); Richard D. Ripley, Rush City, MN (US); Brent A. Erspamer, Blaine, MN (US); Steven M. Schiebel, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 1401 days.

(21) Appl. No.: 13/370,139

(22) Filed: Feb. 9, 2012

(65) Prior Publication Data
US 2012/0223500 A1    Sep. 6, 2012

Related U.S. Application Data

(60) Provisional application No. 61/442,071, filed on Feb. 11, 2011.

(51) Int. Cl.
*B62D 21/00* (2006.01)
*B62D 21/18* (2006.01)
(Continued)

(52) U.S. Cl.
CPC .............. *B62D 21/183* (2013.01); *B60G 3/20* (2013.01); *B60G 7/008* (2013.01); *B60G 7/02* (2013.01);
(Continued)

(58) Field of Classification Search
CPC .......... B60G 3/20; B60G 7/02; B60G 21/055; B60G 7/008; B60G 2300/13;
(Continued)

(56) References Cited

U.S. PATENT DOCUMENTS 3,422,918 A    1/1969    Musser
4,046,403 A    9/1977    Yoshida
(Continued)

FOREIGN PATENT DOCUMENTS

DE            37435 C      11/1886
EP         1493624 A1       1/2005
(Continued)

OTHER PUBLICATIONS

Ray Sedorchuk, New for 2004, Yamaha Rhino 660 4×4, ATV Connection Magazine, © 2006; 3 pages.
(Continued)

*Primary Examiner* — Toan To
(74) *Attorney, Agent, or Firm* — Faegre Baker Daniels LLP

(57) ABSTRACT

A side by side vehicle is disclosed having a vehicle frame, a vehicle seat frame positioned in a mid portion of the frame, and a powertrain. Side by side seats are supported by the seat frame; and one or more storage units are positioned under the side by side seats. The side by side vehicle also has a rear suspension comprising at least one rear alignment arm coupled to each side of a rear of the vehicle frame, where the alignment arms are coupled to the vehicle frame at front and rear connection points. A distance between the front connection points is greater than a distance between the rear connection points, and at least a portion of the powertrain is positioned between the front connection points of the alignment arms.

54 Claims, 36 Drawing Sheets

(51) Int. Cl.
| | |
|---|---|
| *B60G 3/20* | (2006.01) |
| *B60G 7/00* | (2006.01) |
| *B60G 7/02* | (2006.01) |
| *B60N 2/01* | (2006.01) |
| *B60N 2/015* | (2006.01) |
| *B60P 7/08* | (2006.01) |
| *B62D 23/00* | (2006.01) |
| *B62D 21/12* | (2006.01) |
| *B62D 27/06* | (2006.01) |
| *B62D 33/02* | (2006.01) |
| *B62D 33/06* | (2006.01) |
| *B60G 21/055* | (2006.01) |

(52) U.S. Cl.
CPC ........... *B60G 21/055* (2013.01); *B60N 2/012* (2013.01); *B60N 2/015* (2013.01); *B60P 7/0807* (2013.01); *B62D 21/12* (2013.01); *B62D 23/005* (2013.01); *B62D 27/065* (2013.01); *B62D 33/02* (2013.01); *B62D 33/06* (2013.01); *B60G 2300/124* (2013.01); *B60G 2300/13* (2013.01); *B60Y 2200/20* (2013.01)

(58) Field of Classification Search
CPC .. B60G 2300/124; B60N 2/012; B60N 2/015; B60P 7/0807; B62D 21/183; B62D 23/005; B62D 21/12; B62D 27/065; B62D 33/02; B62D 33/06
USPC .... 280/124.133, 124.134, 124.154; 180/312; 296/65.06
See application file for complete search history.

(56) References Cited

U.S. PATENT DOCUMENTS

| | | | |
|---|---|---|---|
| 4,650,210 A | 3/1987 | Hirose | |
| 4,817,985 A | 4/1989 | Enokimoto | |
| 5,327,989 A | 7/1994 | Furuhashi et al. | |
| 5,738,471 A | 4/1998 | Zentner | |
| 5,752,791 A | 5/1998 | Ehrlich | |
| 5,816,650 A † | 10/1998 | Lucas | |
| 5,895,063 A | 4/1999 | Hasshi | |
| 6,113,328 A | 9/2000 | Claucherty | |
| 6,334,364 B1 * | 1/2002 | Suzuki | G01L 5/16 180/444 |
| D467,200 S | 12/2002 | Luo et al. | |
| 6,582,004 B1 † | 6/2003 | Hamm | |
| D497,324 S | 10/2004 | Chestnut et al. | |
| D503,657 S | 4/2005 | Katoh | |
| D504,638 S | 5/2005 | Tanaka | |
| D511,317 S | 11/2005 | Tanaka | |
| 7,014,241 B2 † | 3/2006 | Toyota | |
| 7,281,753 B2 | 10/2007 | Curtis | |
| D555,036 S | 11/2007 | Eck et al. | |
| D578,433 S | 10/2008 | Kawaguchi | |
| D578,934 S | 10/2008 | Tanaka | |
| 7,431,024 B2 | 10/2008 | Buchwitz | |
| 7,510,199 B2 * | 3/2009 | Nash | B60G 7/02 180/311 |
| D592,998 S | 5/2009 | Woodard | |
| D595,613 S | 7/2009 | Lai | |
| D604,201 S | 11/2009 | Kawaguchi | |
| D605,555 S | 12/2009 | Tanaka | |
| D606,900 S | 12/2009 | Flores | |
| D607,377 S | 1/2010 | Shimomura | |
| 7,677,646 B2 | 3/2010 | Nakamura | |
| 7,717,495 B2 † | 5/2010 | Leonard | |
| D621,423 S | 8/2010 | Nakanishi | |
| D622,631 S | 8/2010 | Lai | |
| 7,775,311 B1 * | 8/2010 | Hardy | B60K 1/04 180/291 |
| 7,795,602 B2 † | 9/2010 | Leonard | |
| D624,848 S | 10/2010 | Shimomura | |
| D625,662 S | 10/2010 | Li | |
| 7,819,220 B2 | 10/2010 | Sunsdahl | |
| D631,395 S | 1/2011 | Tandrup | |
| D633,006 S | 2/2011 | Sanschagrin | |
| 7,913,505 B2 | 3/2011 | Nakamura | |
| D636,704 S | 4/2011 | Yoo | |
| D640,598 S | 6/2011 | Zhang | |
| D641,288 S | 7/2011 | Sun | |
| D642,493 S | 8/2011 | Goebert | |
| 8,052,202 B2 | 11/2011 | Nakamura | |
| 8,596,405 B2 | 12/2013 | Sunsdahl et al. | |
| 8,905,168 B2 * | 12/2014 | Kaku | B60N 3/02 180/293 |
| 8,973,693 B2 * | 3/2015 | Kinsman | B60R 21/13 180/89.1 |
| 2001/0031185 A1 | 10/2001 | Swensen | |
| 2005/0077098 A1 | 4/2005 | Takayanagi | |
| 2005/0173177 A1 | 8/2005 | Smith et al. | |
| 2005/0279330 A1 | 12/2005 | Okazaki et al. | |
| 2006/0006696 A1 | 1/2006 | Umemoto et al. | |
| 2007/0214818 A1 | 9/2007 | Nakamura | |
| 2008/0023249 A1 | 1/2008 | Sunsdahl et al. | |
| 2008/0084091 A1 | 4/2008 | Nakamura et al. | |
| 2008/0093883 A1 | 4/2008 | Shibata et al. | |
| 2008/0256738 A1 | 10/2008 | Malone | |
| 2009/0301830 A1 | 12/2009 | Kinsman | |
| 2010/0012412 A1 * | 1/2010 | Deckard | B62D 25/20 180/90.6 |
| 2010/0155170 A1 * | 6/2010 | Melvin | B60K 11/08 180/339 |
| 2010/0194086 A1 | 8/2010 | Yamamura | |
| 2010/0314184 A1 | 12/2010 | Stenberg | |
| 2010/0317485 A1 * | 12/2010 | Gillingham | B60K 1/04 477/7 |
| 2011/0155087 A1 | 6/2011 | Wenger | |
| 2012/0031693 A1 | 2/2012 | Deckard et al. | |

FOREIGN PATENT DOCUMENTS

| | | |
|---|---|---|
| EP | 2057060 A2 | 5/2009 |
| FR | 2914597 A1 | 10/2008 |
| GB | 2036659 A | 7/1980 |
| JP | 63-25977 B2 † | 5/1988 |
| JP | 7040783 A | 2/1995 |
| JP | 2001130304 A | 5/2001 |
| JP | 2003-237530 A † | 8/2003 |
| JP | 2010-95106 A † | 4/2010 |

OTHER PUBLICATIONS

Yamaha, Company Website, 2006 Rhino 450 Auto 4×4, © 2005; 3 pages.
Yamaha, Company Website, 2006 Rhino 660 Auto 4×4 Special Edition, © 2006; 4 pages.
Yamaha, Company Website, 2006 Rhino 660 Auto 4×4, © 2006; 4 pages.
Yamaha, Company Website, Rhino 660 Auto 4×4 Exploring Edition Specifications, © 2006; 3 pages.
Artic Cat, Company Website, Prowler XT650 H1, undated; 9 pages.
Club Car, Company Website, product pages for XRT 1500 SE, undated; 2 pages.
Honda Hippo 1800 New Competition for Yamaha's Rhino, Dirt Wheels Magazine, Apr. 2006, pp. 91-92.
Buyer's Guide Supplement, 2006 Kart Guide, Powersports Business Magazine; 6 pages.
BRP Can-Am Commander photo, undated; 1 page.
Polaris Ranger Welcome to Ranger Country Brochure 2006, © 2005; 24 pages.
Polaris Ranger Brochure ATVs and Side×Sides Brochure 2010, © 2009; 26 pages.
Polaris Ranger RZR Brochure 2011, © 2010; 16 pages.
Polaris Ranger Brochure 2011, © 2010; 22 pages.
Kawasaki Mule Utility Vehicle Brochure 2009, © 2008; 10 pages.
Kawasaki Mule the Off-Road Capable 610 4×4 XC Brochure 2011, © 2010; 6 pages.

(56) References Cited

OTHER PUBLICATIONS

Kawasaki Teryx Recreation Utility Vehicle Brochure 2009, © 2008; 8 pages.
Kawasaki Teryx 750 FI 4×4 Sport Brochure 2011, © 2010; 6 pages.
Polaris Ranger Off-Road Utility Vehicles Brochure 2004, © 2003; 20 pages.
Polaris Ranger Work/Play Only Brochure 2008, © 2007; 28 pages.
Polaris Ranger Brochure 2009, © 2008; 32 pages.
International Search Report and Written Opinion issued by the European Patent Office, dated Jun. 28, 2012, for International PCT Application No. PCT/US2012/024664; 19 pages.
International Preliminary Report on Patentablility issued by the European Patent Office, dated Mar. 8, 2013, for International PCT Application No. PCT/US2012/024664; 24 pages.
International Search Report and Written Opinion issued by the European Patent Office, dated Jul. 23, 2013, for International PCT Application No. PCT/US2013/039304; 11 pages.
International Preliminary Report on Patentability issued by the International Bureau of WIPO, Geneva, Switzerland, dated Nov. 4, 2014 for International Application No. PCT/US2013/039304; 7 pages.

\* cited by examiner
† cited by third party

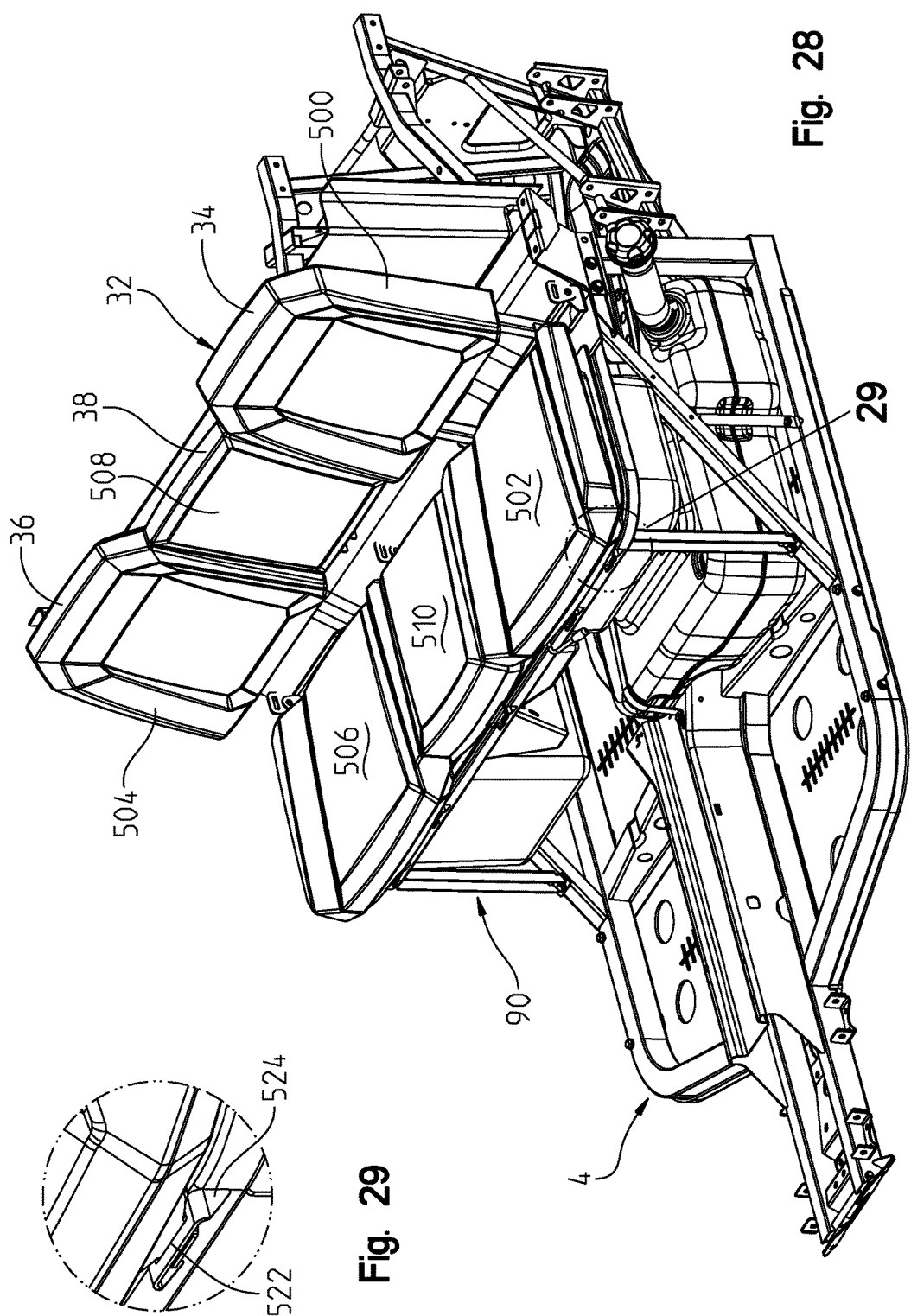

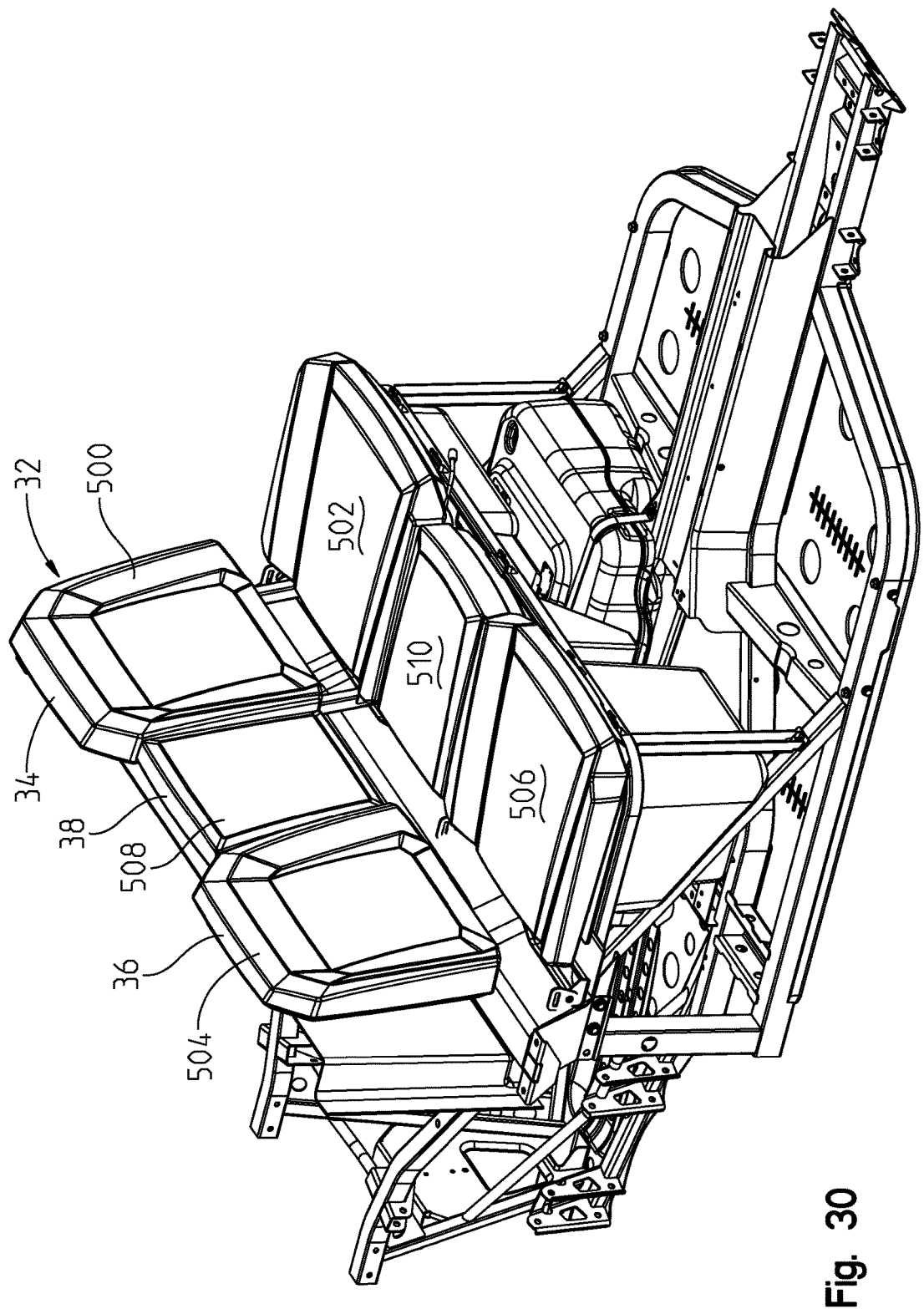

//<br>
SIDE-BY-SIDE ALL TERRAIN VEHICLE

The subject application claims priority from U.S. provisional patent application Ser. No. 61/442,071 filed Feb. 11, 2011, the subject matter of which is incorporated herein by reference.

SUMMARY

The subject disclosure is generally related to side by side all terrain vehicles.

Generally, all terrain vehicles ("ATVs") and utility vehicles ("UVs") are used to carry one or two passengers and a small amount of cargo over a variety of terrains. Due to increasing recreational interest in side by side vehicles, such as those used for trail riding, recreational use, and cargo hauling have entered the market place.

Most side by side vehicles include seating for two to three passengers. Side-by-side vehicles, in which the driver and passenger are seated beside each other on laterally spaced apart seats, have become popular because of the ability to allow the passenger to share the driver's viewpoint and riding experience instead of being positioned behind the driver. Two styles of vehicle are known in the marketplace; a first sportive version is known where the driver sits low in the vehicle, and one such vehicle is shown in U.S. Pat. No. 7,819,220 (and counterpart EP2057060), the subject matter of which is incorporated herein by reference. The second version has the driver seated higher in the vehicle, and one such vehicle is shown in US patent application publication number 20090301830, the subject matter of which is incorporated herein by reference.

In one embodiment described herein, a side by side vehicle is disclosed having a vehicle frame having frame tubes extending from a front to a rear. A vehicle seat frame is positioned in a mid portion of the frame, and positions a seat frame at a raised position relative to the frame tubes. A powertrain is positioned rearward of the vehicle seat frame and is coupled to the vehicle frame. Side by seats are supported by the seat frame; and one or more storage units are positioned under the side by side seats.

In another embodiment, a side by side vehicle comprises a vehicle frame having frame tubes extending from a front to a rear. A vehicle seat frame is positioned in a mid portion of the frame, and positions a seat frame at a raised position relative to the frame tubes. A powertrain is positioned rearward of the vehicle seat frame and is coupled to the vehicle frame. Side by side seats are supported by the seat frame. A rear suspension comprising at least one rear alignment arm is coupled to each side of a rear of the vehicle frame, where the alignment arms are coupled to the vehicle frame at front and rear connection points. A distance between the front connection points is greater than a distance between the rear connection points, and at least a portion of the powertrain is positioned between the front connection points of the alignment arms.

In another embodiment, a side by side vehicle comprises a vehicle frame, a vehicle seat frame positioned in a mid portion of the frame, and positioned at a raised position relative to the frame tubes. A powertrain is positioned rearward of the vehicle seat frame and is coupled to the vehicle frame. Side by side seats are supported by the seat frame and one or more storage units positioned under the side by side seats. A rear suspension has at least one first connection point to the frame, wherein at least a portion of the powertrain is positioned rearward of the first connection point.

In another embodiment, a side by side vehicle comprises a vehicle frame; and a vehicle seat frame positioned in a mid portion of the frame, with the seat frame at a raised position relative to the frame tubes. Side by side seats are supported by the seat frame. A powertrain is positioned rearward of the vehicle seat frame and is supported by the vehicle frame. At least one storage unit is positioned under the side by side seats; and the storage bin houses an electronic assembly of the vehicle.

In yet another embodiment, a side by side vehicle comprises a vehicle frame, side by side seats supported by the frame, a powertrain supported by the vehicle frame; a cargo storage device supported by the frame, the storage area device having apertures extending therethough; and tie down members extending through the apertures to an upper side of the cargo storage device, and coupled to an opposite side.

The embodiments will now be described by way of the drawings, where:

BRIEF DESCRIPTION OF THE DRAWINGS

FIG. 28 is a left front perspective view of the seating assembly of the present vehicle as assembled to the frame;

FIG. 29 is an enlarged view of the portion denoted in FIG. 28;

FIG. 30 is a right front perspective view of the seating assembly of FIG. 28;

DETAILED DESCRIPTION OF THE EMBODIMENTS

Figure 1:
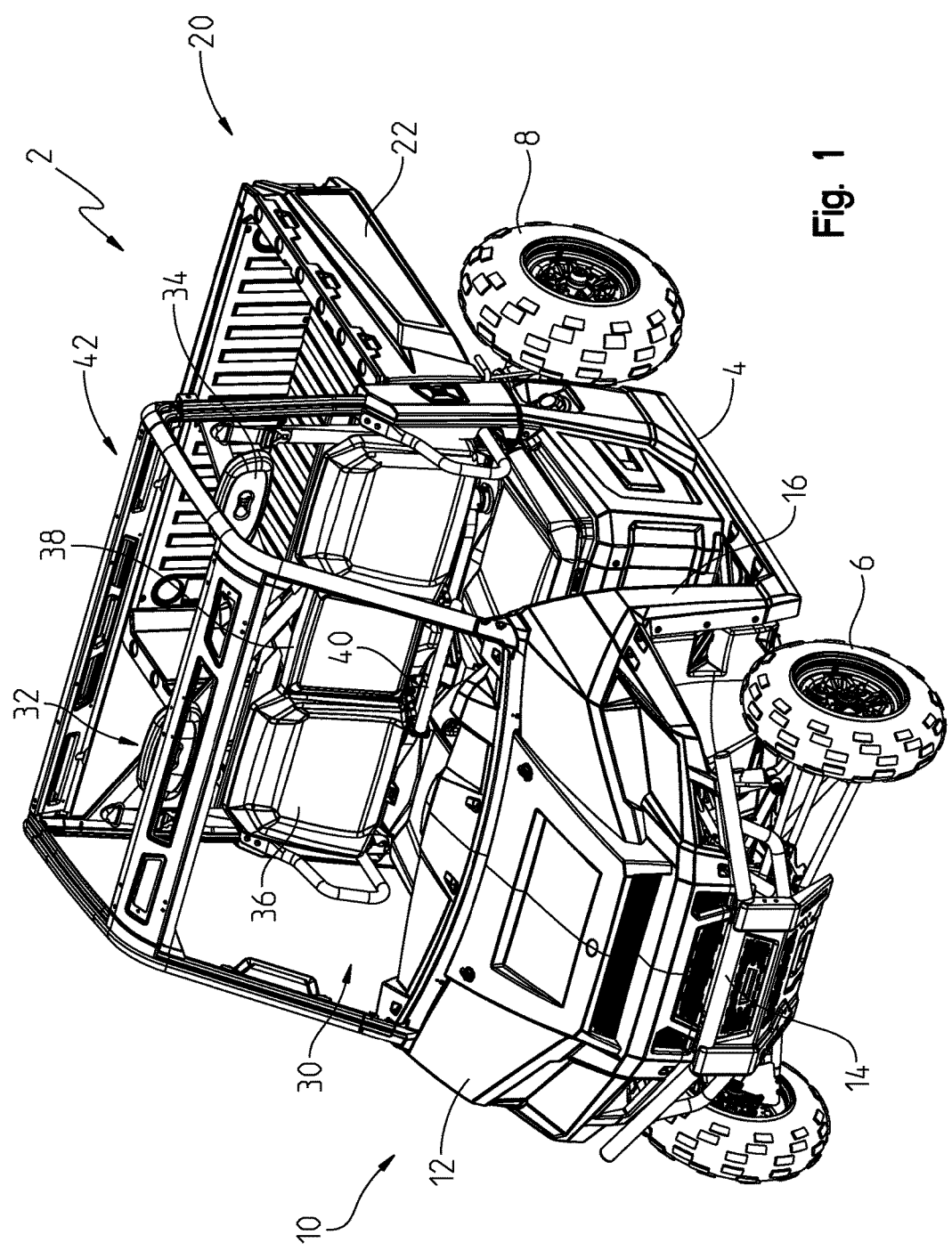
FIG. 1 is a front left perspective view of the vehicle of the present disclosure.

With reference to FIG. 1, the utility vehicle is shown generally at 2 to include a frame 4 supported by front wheels 6 and rear wheels 8. Utility vehicle 2 includes a front end 10 having a hood 12, bumper 14 and side body panel 16. Utility vehicle 2 also includes a rear end 20 having a utility cargo box 22 as described further herein. Utility vehicle 2 also includes an operator area at 30 comprising a bench seat assembly 32 having a driver's seat 34, a passenger seat 36 and a center passenger seat at 38. Operator controls such as a steering wheel is provided at 40. A roll cage 42 surrounds the entire operator area 30.

Figure 2:
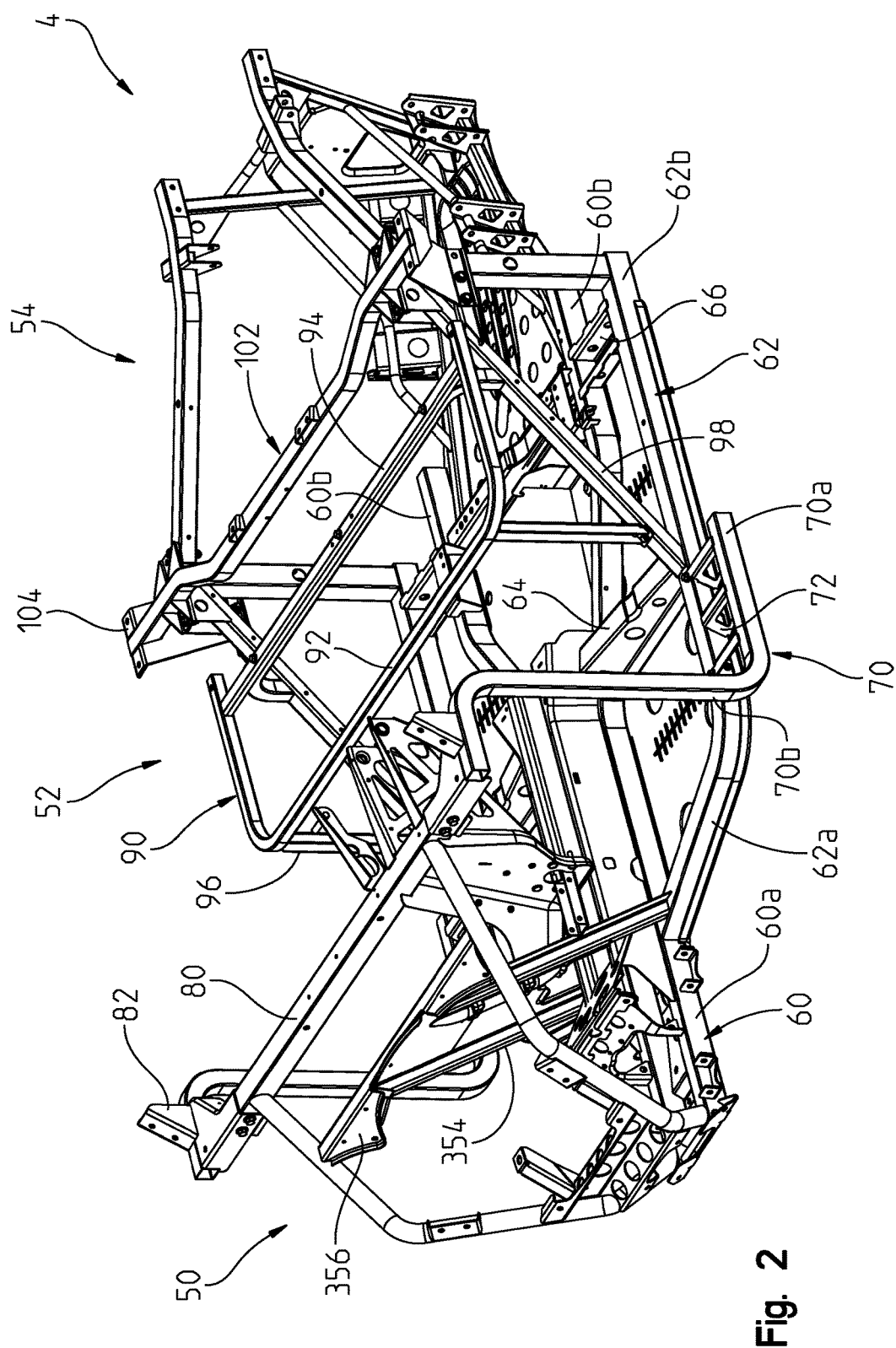
FIG. 2 is a front left perspective view of the frame of the present vehicle.
Figure 3:
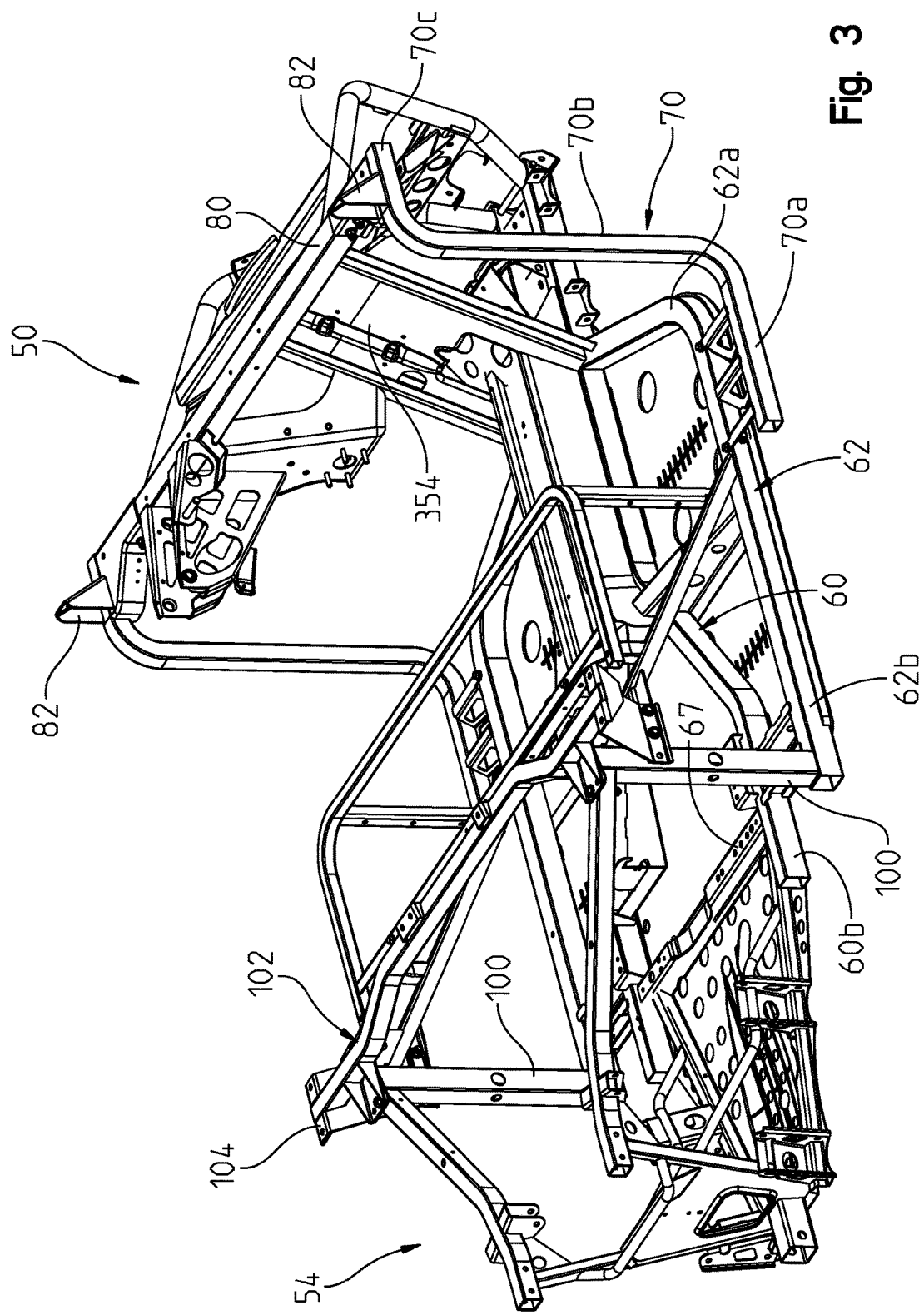
FIG. 3 is a right rear perspective view of the vehicle of the present disclosure.

With reference now to FIGS. 2 through 6, the frame will be described in greater detail. With reference first to FIG. 2, frame 4 generally includes a frame front portion 50, a frame mid portion 52 and a frame rear portion at 54. Central frame tubes 60 extend generally lengthwise between the front frame portion 50 and the rear frame portion 54 having a front portion at 60a and a flared out portion towards the rear at 60b. An outer frame tube member is provided at 62 which is connected to frame tube portion 60a; by tube portion 62a adjacent a front, and spaced apart from frame tube 60b by frame tube portion 62b. A cross tube such as 64 integrates the frame tubes 60 and 62 towards a center of the vehicle and frame channels 66 and 67 (FIG. 3) integrate the frame tubes 60 and 62 adjacent a rear of the vehicle.

A removable frame portion 70 is attached to frame tube 62 by way of brackets 72, as further described herein. As shown best in FIG. 7, removable frame portion 70 has a lower frame portion 70a, a vertically upstanding portion at 70b and an upper horizontally extending portion 70c. Removable frame portion 70 further includes gussets at 82 as described herein. A transverse brace 80 extends between the two portions 70c. Frame 4 further includes a seat frame portion at 90 having transversely extending frame tubes at 92 and 94 supported by upstanding braces 96 and diagonal braces 98. As shown best in FIG. 3, support posts 100 upstand from frame tubes 62 and support a transverse beam 102. Transverse beam 102 is removable from post 100 and also includes an upper mounting area or flange at 104, as further described herein.

Figure 4:
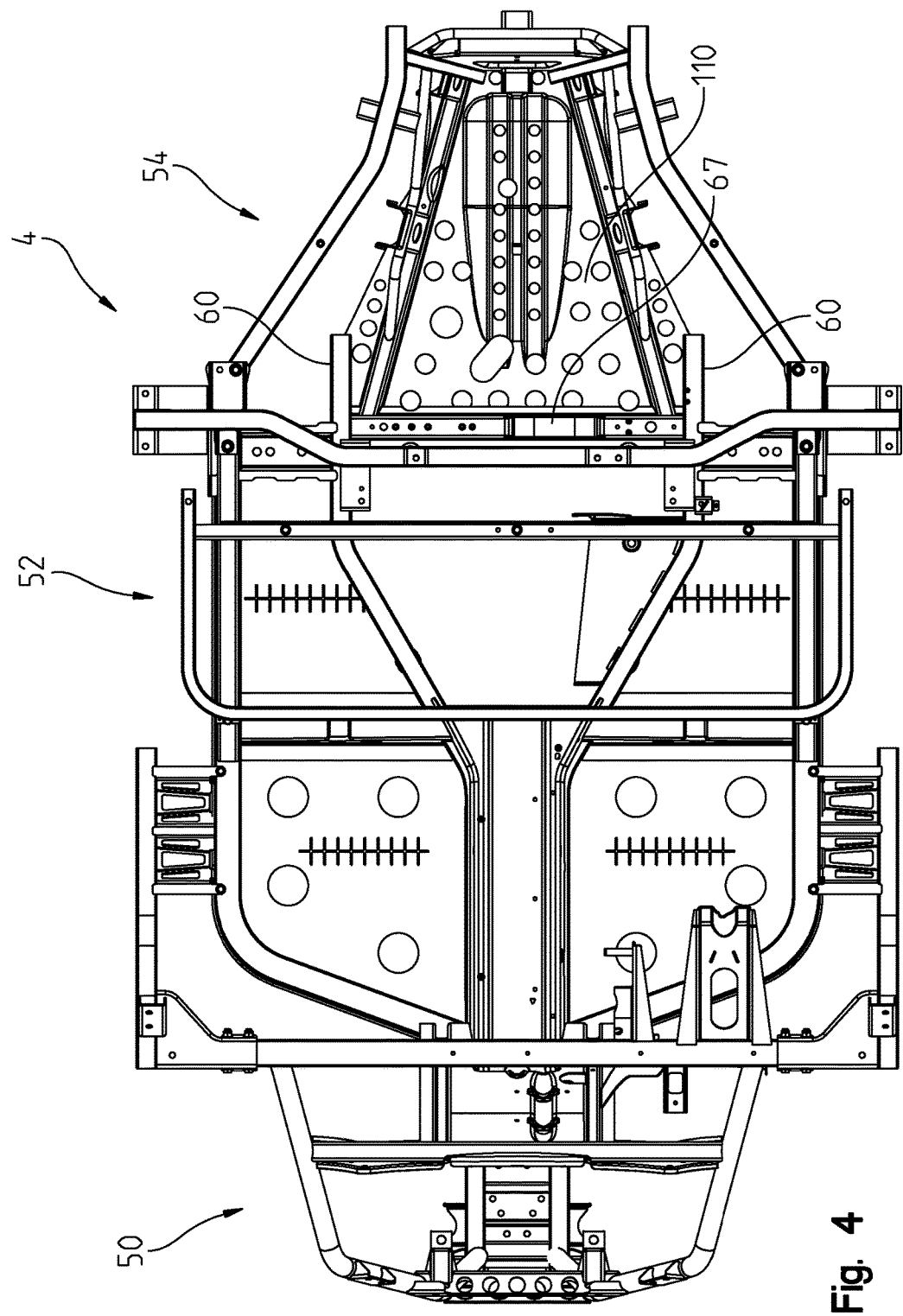
FIG. 4 is a plan view of the frame of FIGS. 2-3.
Figure 5:
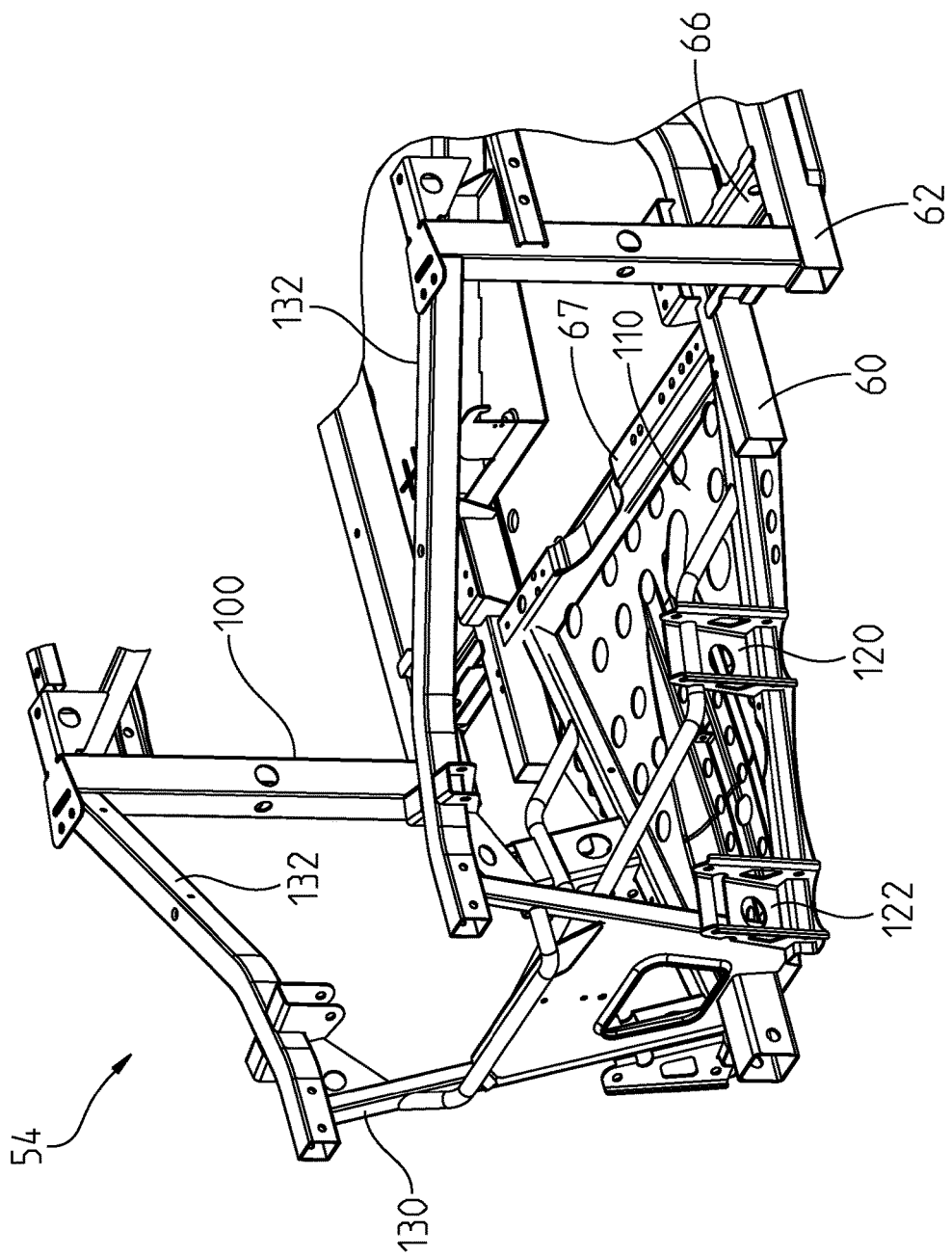
FIG. 5 is a partial rear perspective view of the frame of the present disclosure.
Figure 6:
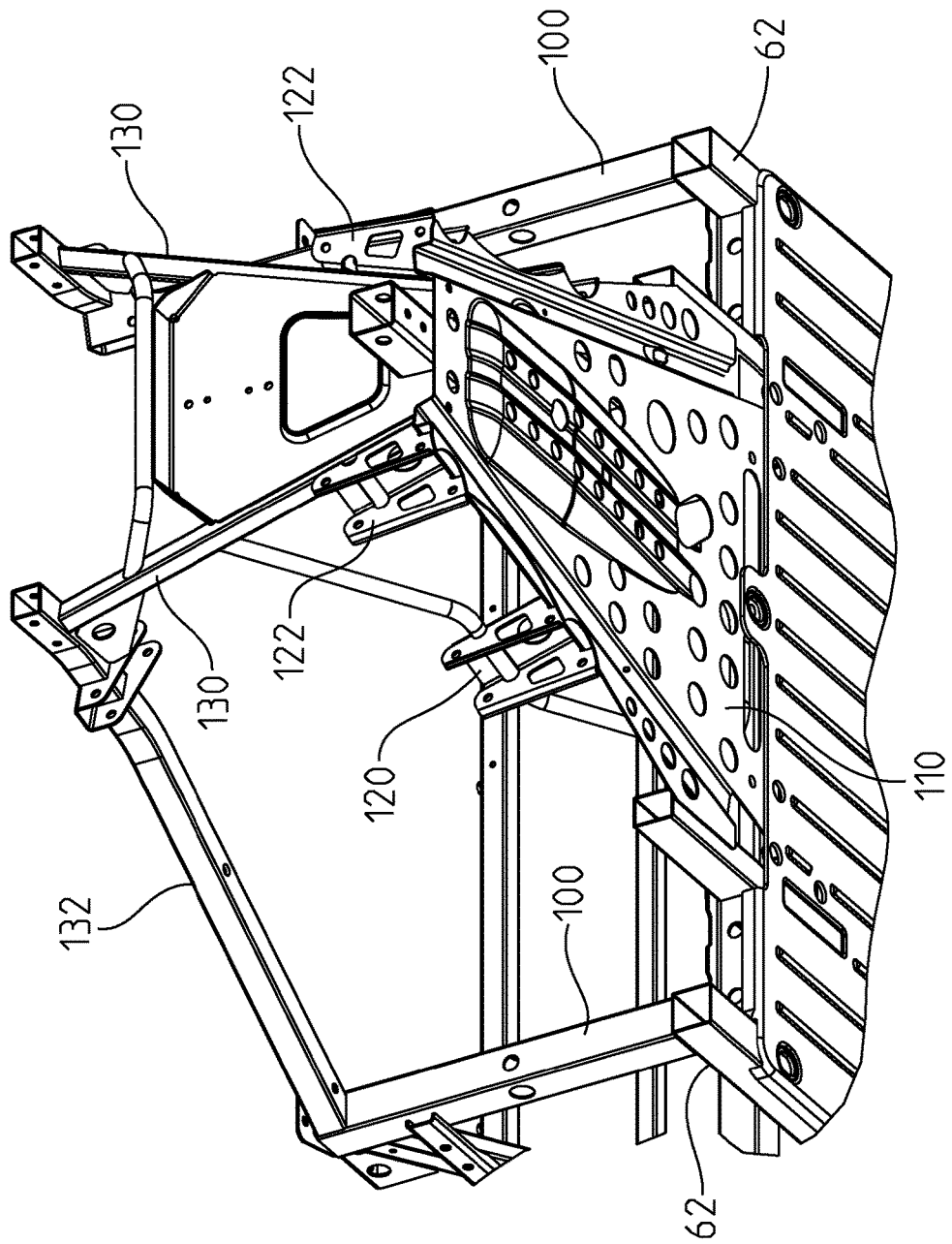
FIG. 6 is an underside perspective view of the frame of FIG. 5.

With respect now to FIGS. 4-6, a rear engine pan 110 is provided extending from channel 67 and frame tubes 60. Pan 110 defines the support platform for the drivetrain of the vehicle as will be described herein. Vertically extending channels 120, 122 (FIGS. 5, 6) extend from each side of the pan 10 and define locations for mounting alignment arms (A-arms) as described herein. Vertically extending tubes 130 extend upwardly from pan 110 and support upper frame arms 132.

Figure 7:
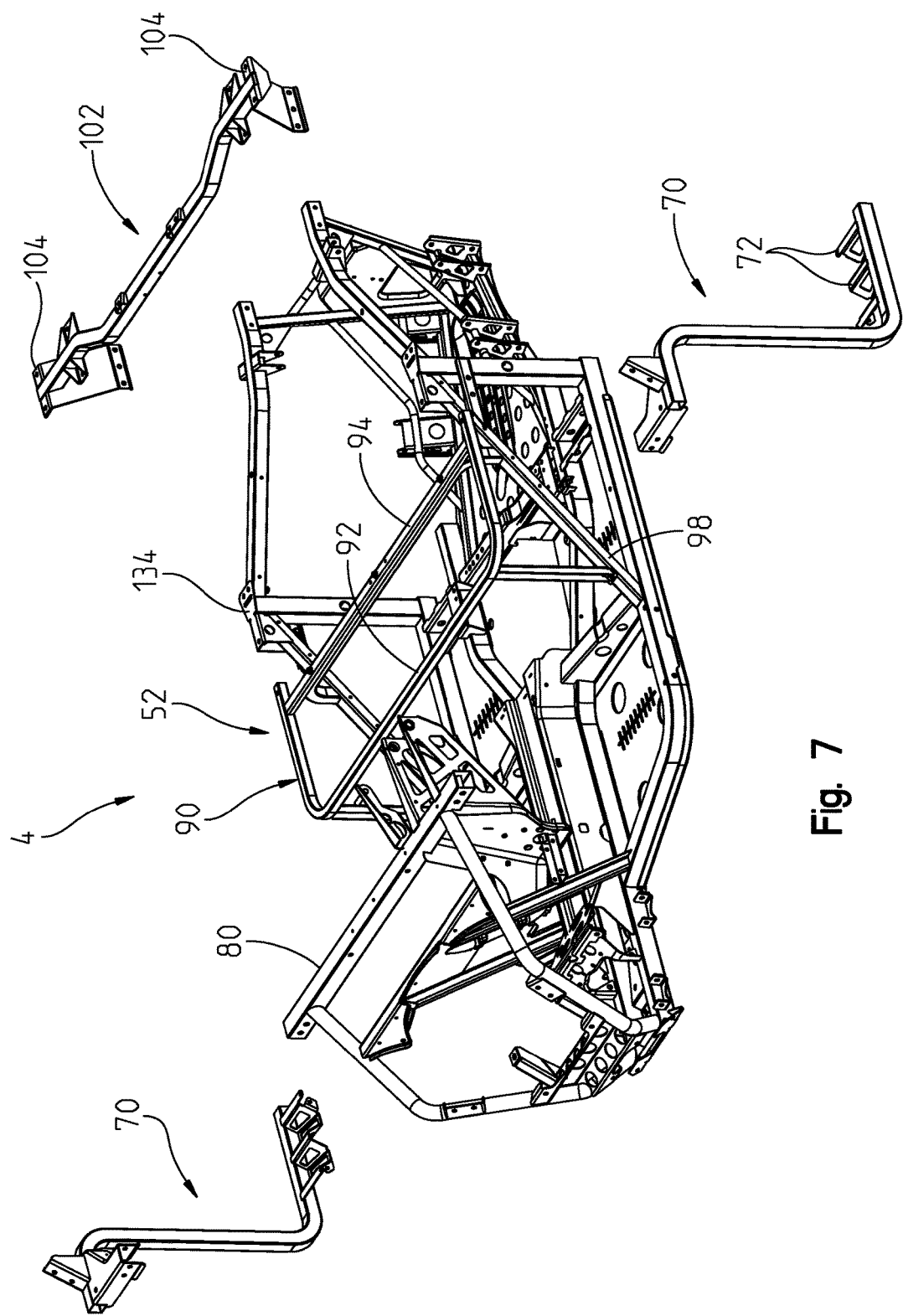
FIG. 7 is a perspective view showing removable frame components of the frame exploded away from the vehicle frame.
Figure 8:
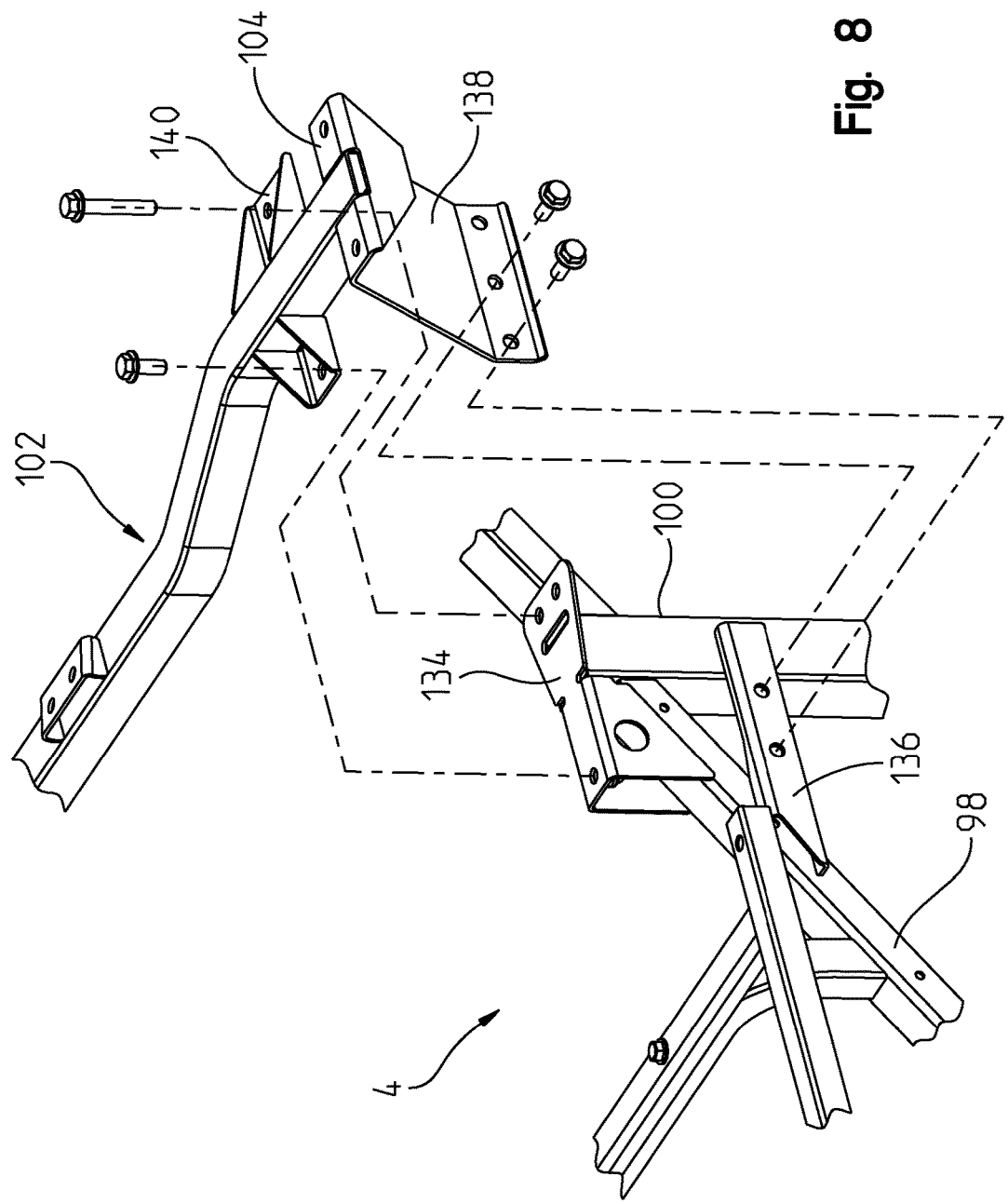
FIG. 8 shows a detailed view of a portion of the removable component.
Figure 9:
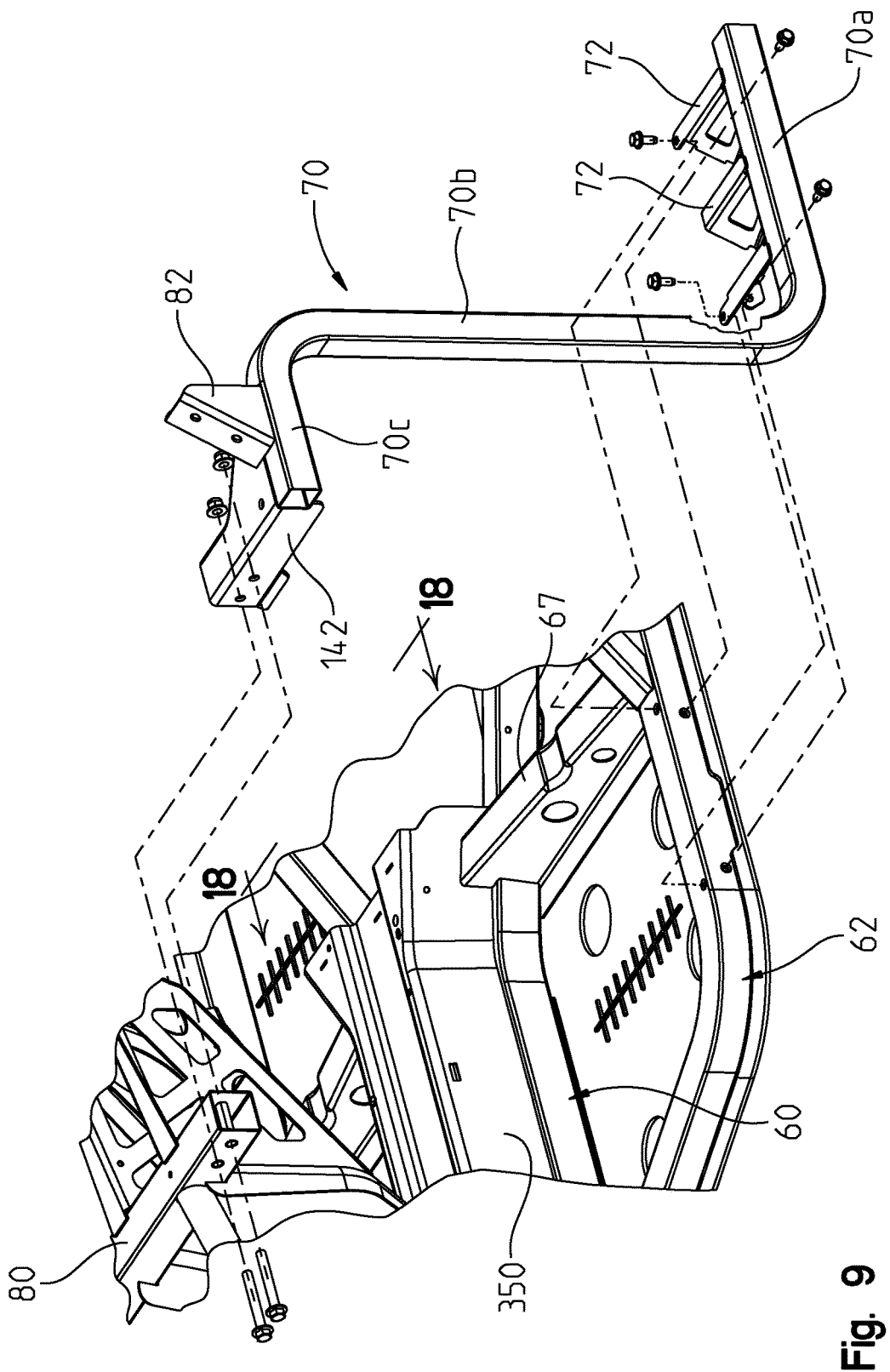
FIG. 9 shows another portion of a removable component.

With respect now to FIGS. 7 and 8, frame 4 further includes an upper mounting flange 134 attached to diagonal tube 98 and a side tube 136 (FIG. 8) extending between diagonal tube 98 and post 100. As shown in FIG. 8, transverse beam 102 is provided with a bracket 138 and a flange 140, where flange 140 attaches to flange 134 and where bracket 138 attaches to side tube 136 by way of fasteners as shown. As shown in FIG. 9, removable frame portion 70 includes a bracket 142 attached to horizontally extending portion 70c which is removably attached to transverse brace 80 by way of fasteners as shown. Lower frame portion 70a is also attached to frame tube 62 by way of fasteners through brackets 72 as shown.

Figure 10A:
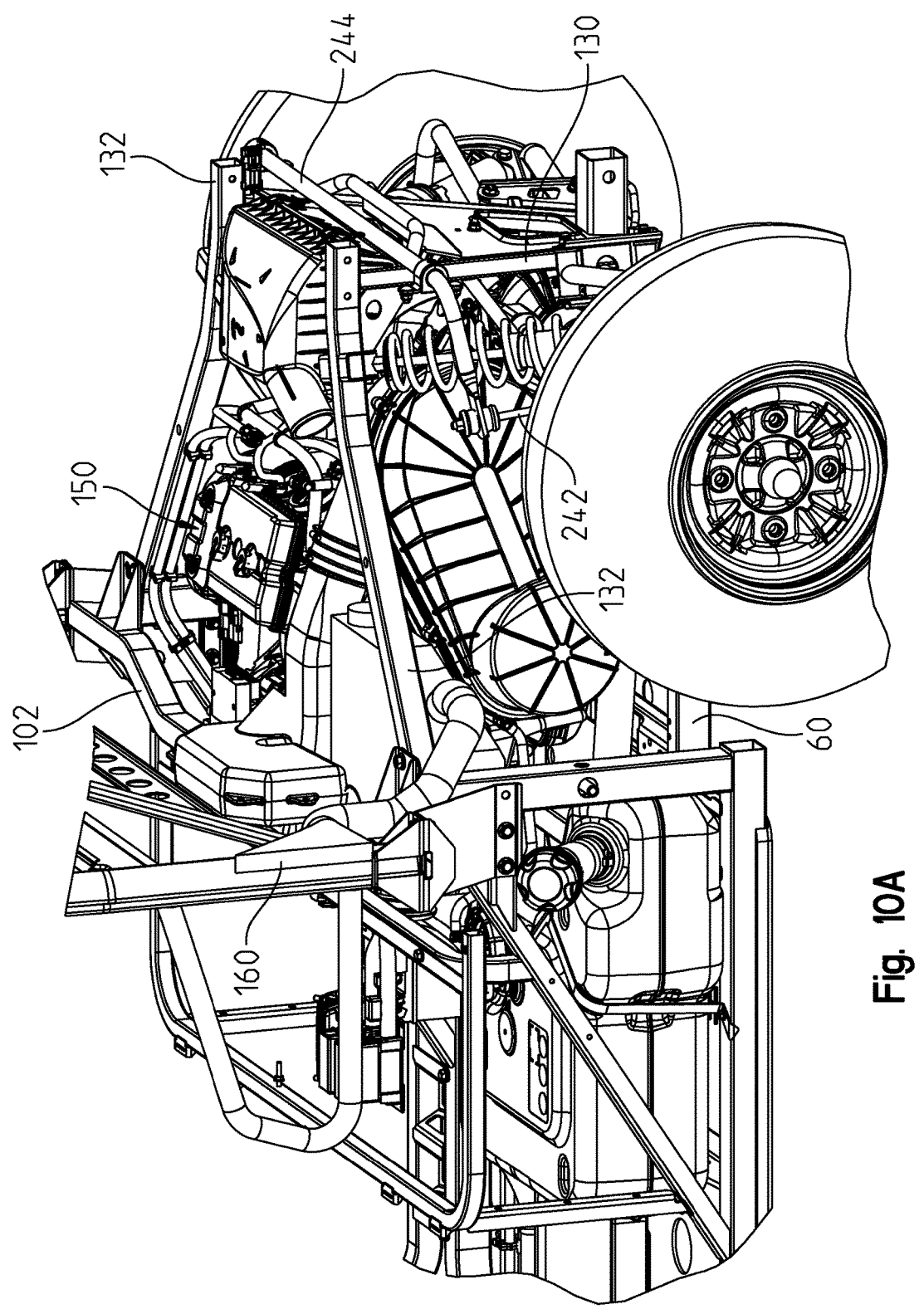
FIG. 10A shows a rear perspective view showing the engine and the transmission positioned in the frame of the present disclosure.
Figure 10B:
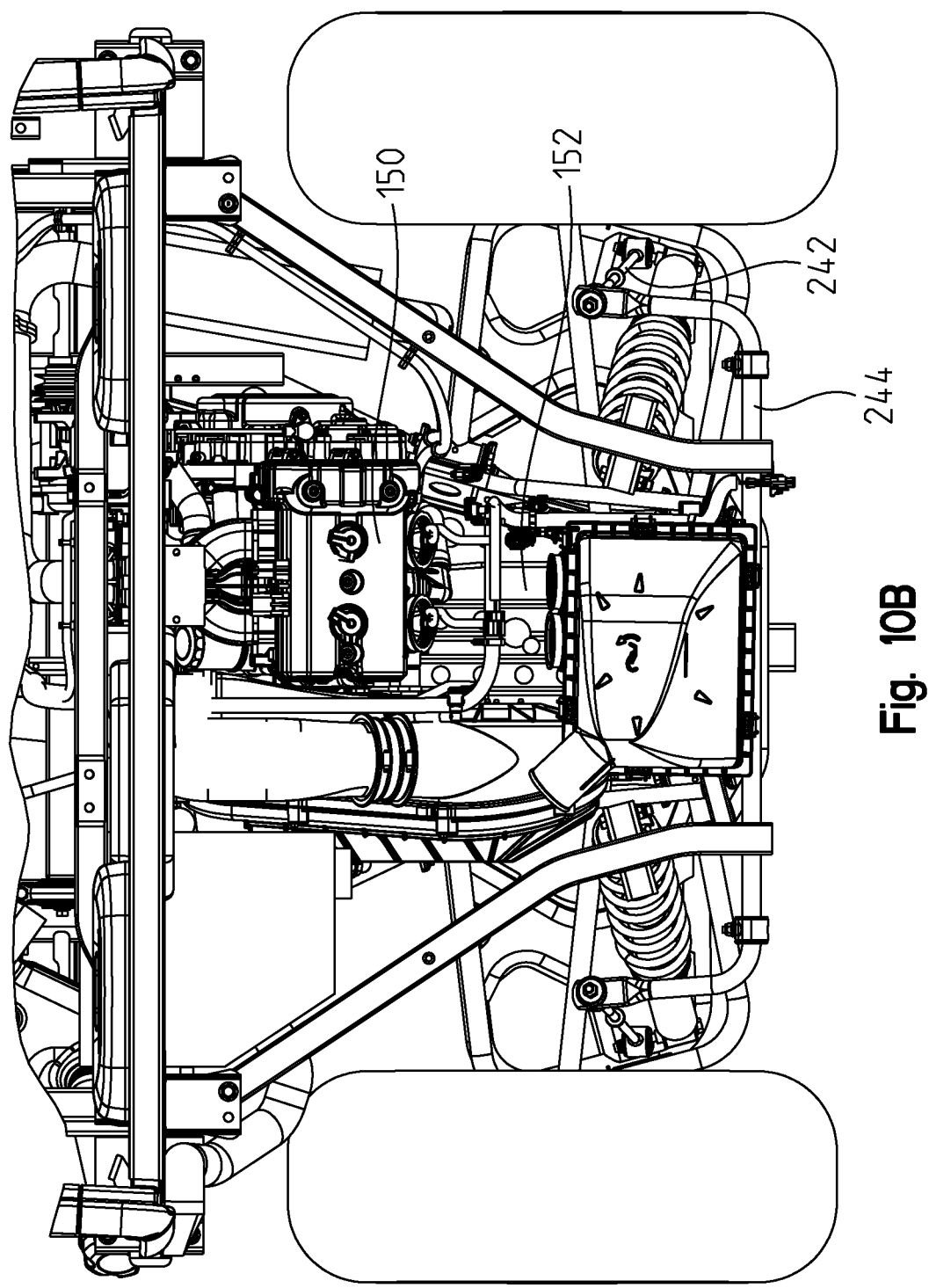
FIG. 10B shows a top plan view showing the engine and the transmission positioned in the frame of the present disclosure.
Figure 11:
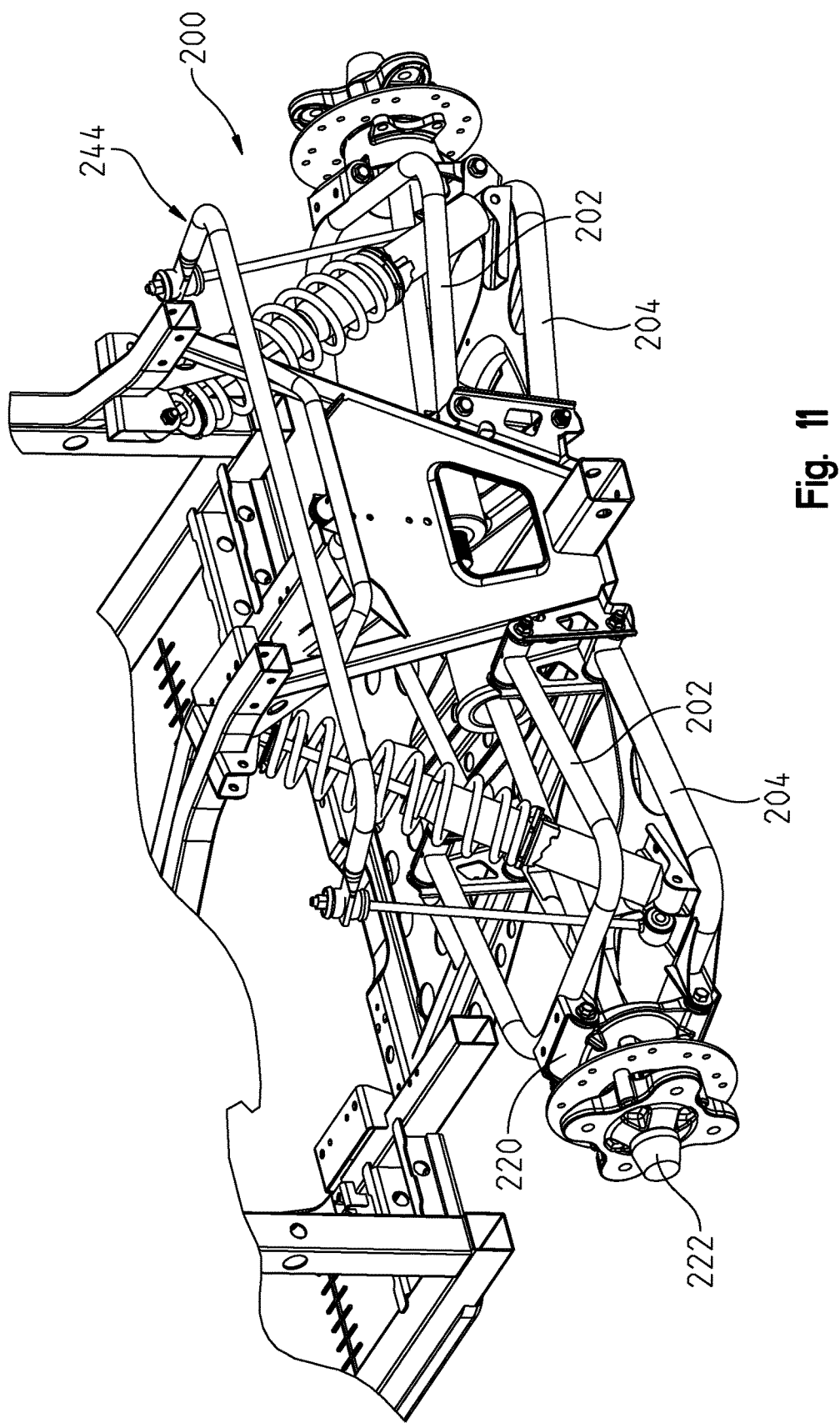
FIG. 11 shows a rear perspective view of the rear suspension.

With reference now to FIGS. 10A and 10B, engine 150 is shown mounted on pan 110 together with transmission 152. It should be noted that engine 150 is of the type shown and described in assignee's Ser. No. 61/385,802 filed Sep. 23, 2010, and corresponding PCT application PCT/US2011/52914; the subject matter of which are incorporated herein by reference. Transmission 152, the mounting of the engine 150 and transmission 152 together, as well as the mounting of the engine 150 and the transmission 152 to frame 4, is similar to that shown in either of U.S. patent application Ser. Nos. 12/849,480 or 12/849,516, both of which were filed on Aug. 3, 2010, and corresponding PCT application PCT/US2011/46395; the subject matter of which are incorporated herein by reference.

As shown, an air intake 160 is shown which would be mounted to a cover which surrounds the roll cage 50.

Figure 12:
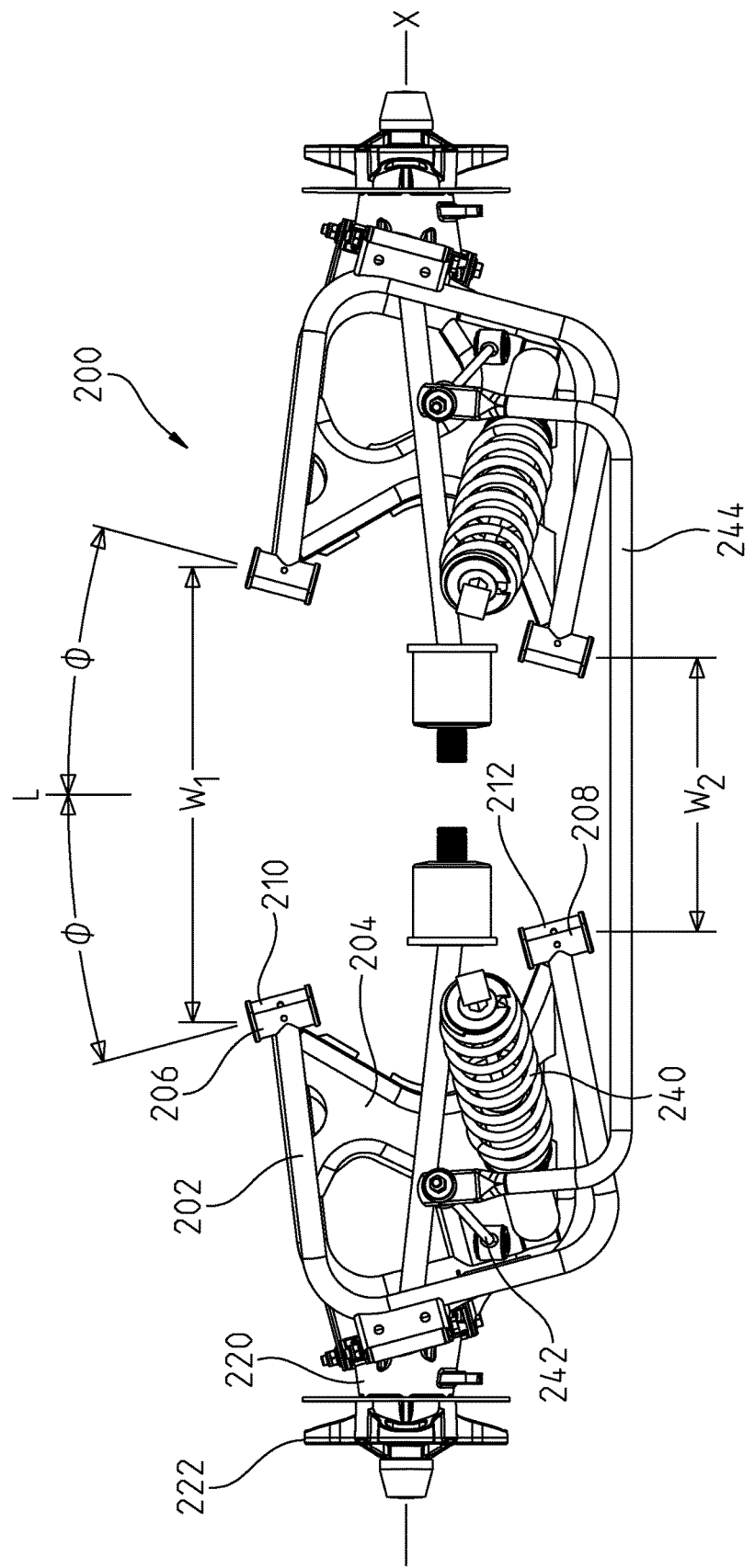
FIG. 12 shows a top view of the A-arms of the present disclosure.
Figure 13:
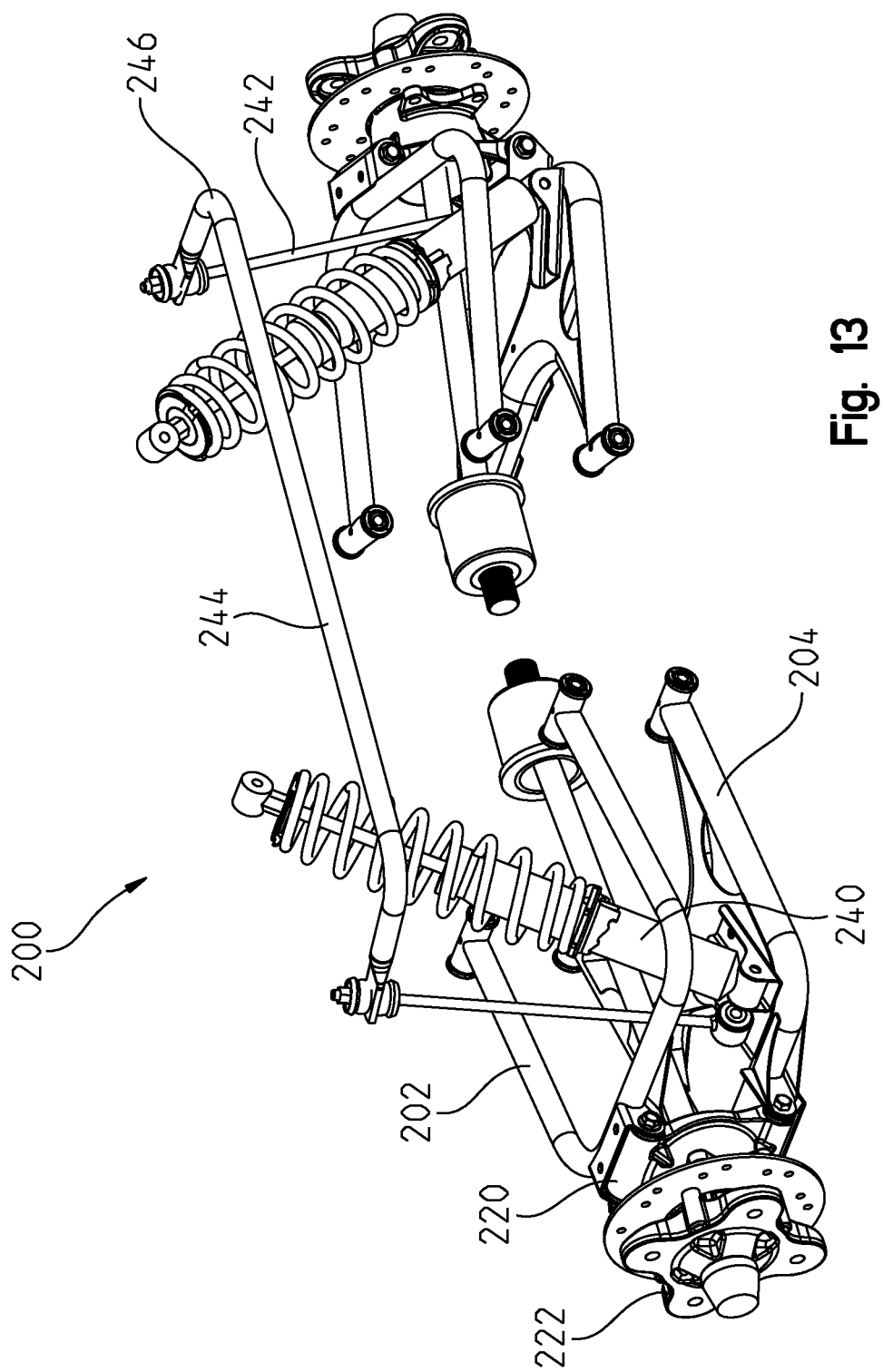
FIG. 13 shows a rear perspective view of the suspension assembly.

A re-designed suspension is shown generally as 200 in FIGS. 11-14. The suspension is re-designed to provide a space for the engine and transmission 150, 152 when the engine and transmission is mounted rearward of the seats as shown herein. More particularly, the rear suspension is provided by upper alignment arms 202 and lower alignment arms 204 whereby forward connections 206 of upper alignment arms 204 are spaced apart by a greater distance than their respective rearward connections 208; that is $W_1 > W_2$ (FIG. 12). This provides a lateral distance or width $W_1$ between the alignment arms which can receive the transmission, or at least a portion of the powertrain, there between. In a like manner, lower alignment arms 204 have forward connections 210 spaced apart at a greater distance than lower connections 212.

Figure 14:
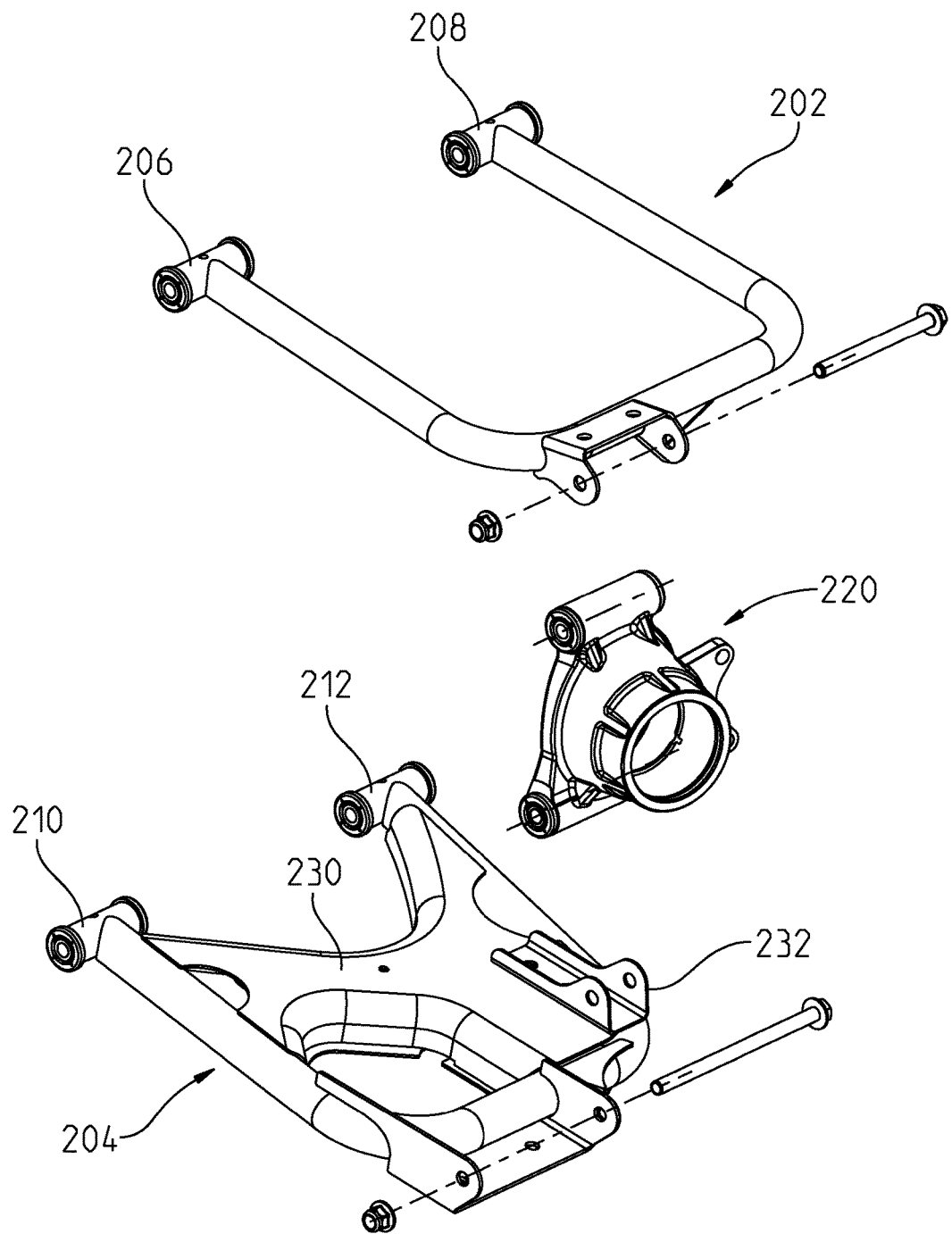
FIG. 14 shows an exploded view of a portion of the suspension of the present disclosure.

As shown, both upper and lower alignment arms 202, 204 are rectangular in configuration, and connect to a hub 220 at a forward and outer corner of the alignment arms. As shown in FIG. 12, the alignment arms extend at oblique angles Ø relative to a longitudinal axis L, and each of the hubs 220 includes a spindle 222 which rotates along an axis X transverse to the longitudinal axis L. As shown in FIG. 14, lower alignment arms 204 further comprise a lower plate portion 230 which provides a bracket 232 for both a shock absorber 240 and a mounting arm 242 of torsion bar 244.

Torsion bar 244 is shown in FIGS. 10-13 rotationally mounted to upright 130, and with torsion bar arms 246 extending forwardly. The location of the hubs 220 provides room for the shock absorbers 240 and mounting arm 242 of the torsion bar 244, as best shown in FIG. 12.

Figure 15:
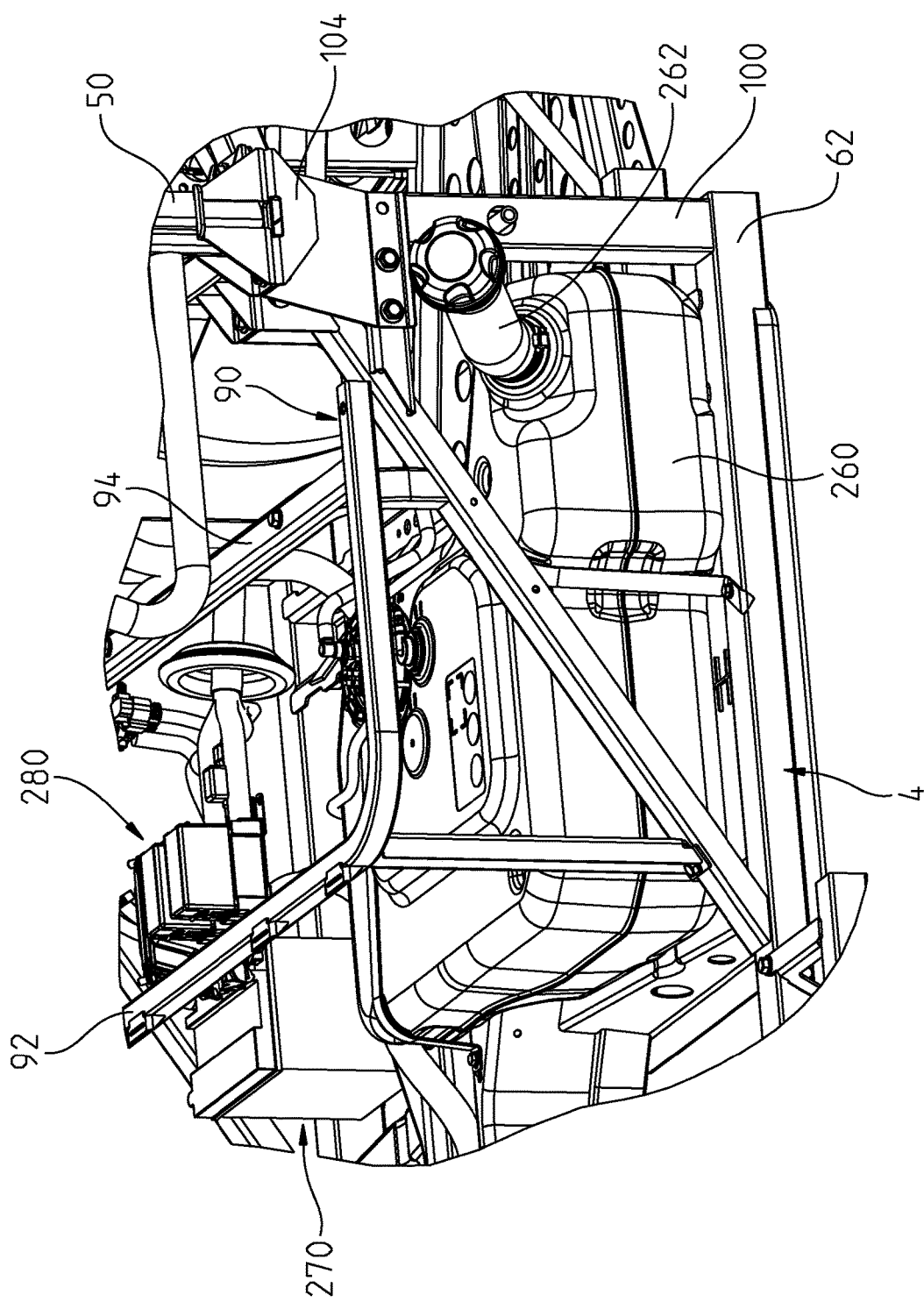
FIG. 15 shows components positioned under the seat frame of the present disclosure.

With reference now to FIG. 15, due to the location of the engine rearward of the seat 32, the area beneath the seat frame 90 is now available for other system components. As shown, fuel tank 260 is shown positioned below the seat frame 90 with a filler tube 262 extending out from the driver's side and beyond the frame formed by frame tube 62 and post 100. Battery 270 is shown positioned below a passenger side of the seat frame 90. Meanwhile an electronic assembly 280 is positioned below the center seat of frame 90, and the electronic assembly may comprise an engine control unit, a vehicle control unit, relays and the like.

Figure 16:
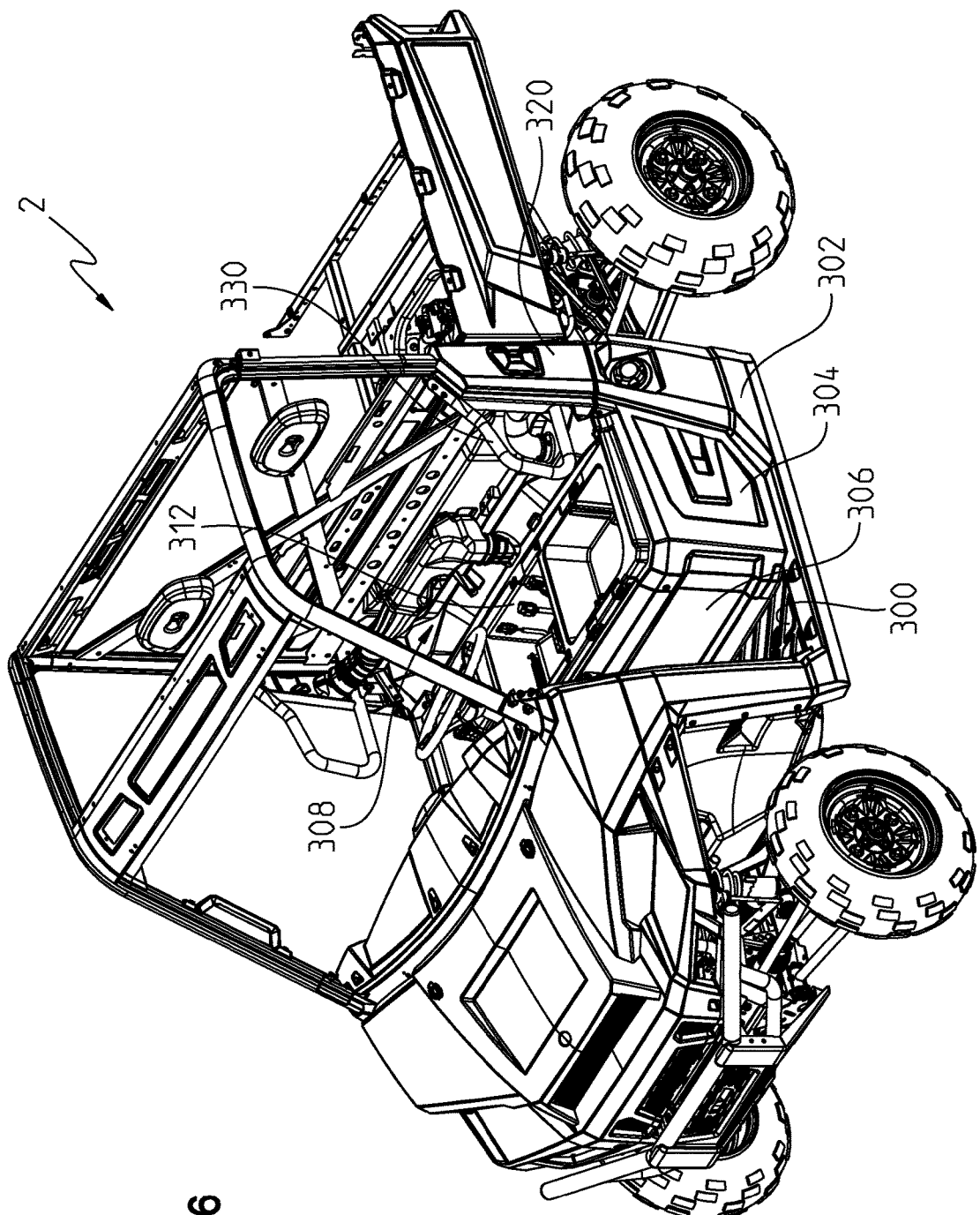
FIG. 16 shows a partially assembled vehicle showing chassis components positioned over the vehicle's seat frame.
Figure 17:
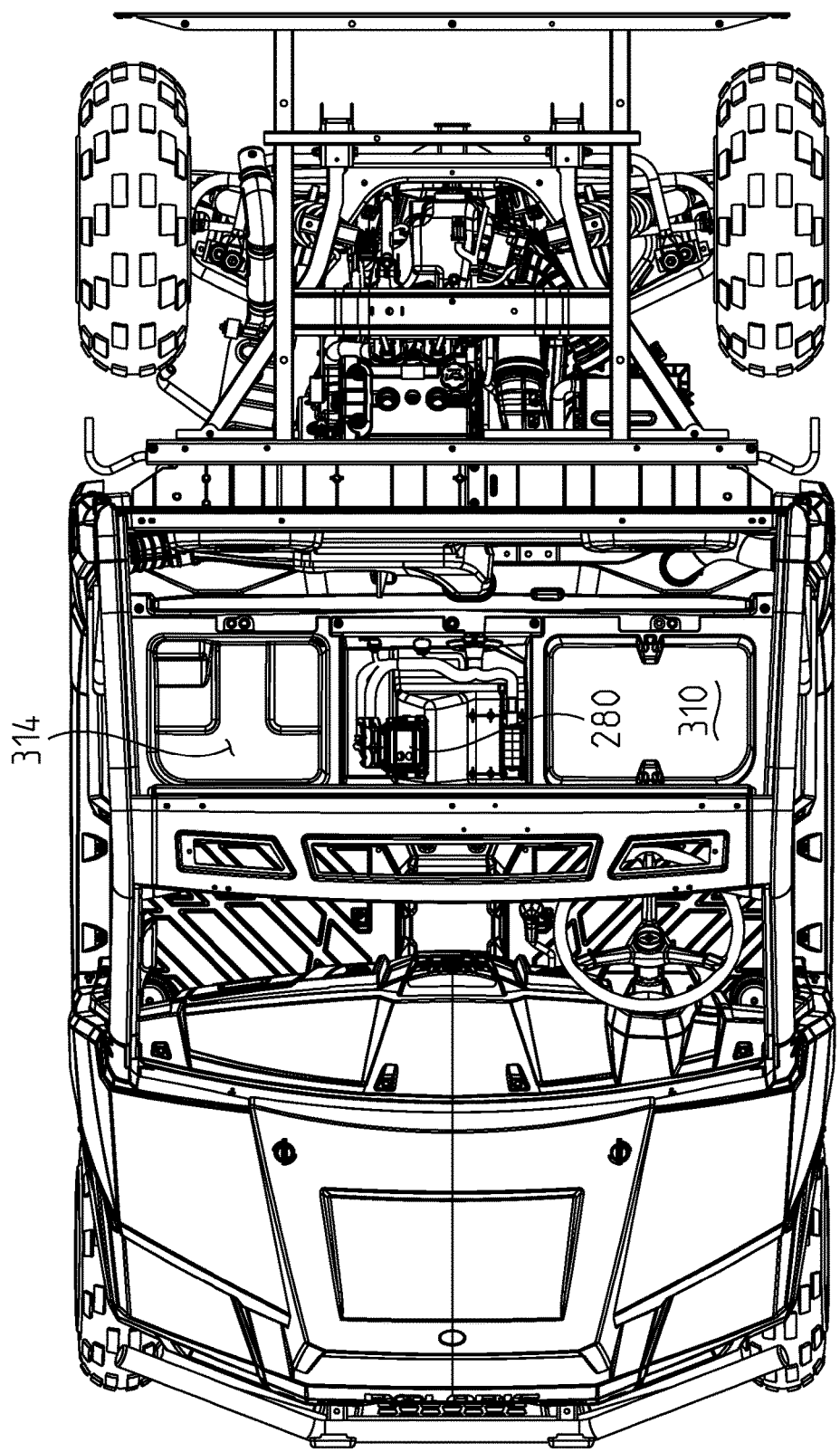
FIG. 17 is a top plan view of the vehicle of FIG. 16.

With respect now to FIGS. 16-17, vehicle 2 is finished off by floor board 300, side panel 302, seat side cover 304 and seat front cover 306. Storage pan 308 is positioned over frame 90 and over transverse bar 102 (FIG. 10) and includes three separate storage areas, namely storage area 310 directly below driver's seat, center storage area 312 accommodating the electronic assembly 280, and storage area 314 (FIGS. 12 and 17) positioned below passenger seating area. Panel 320 surrounds the intersection of rear roll cage portion 402 and plate 104 (FIG. 10) and a sound/heat shield 330 (FIG. 16) is positioned behind seat 32 and forward of engine 150 to prevent heat and noise from the engine 150 into the operator's area.

Figure 18:
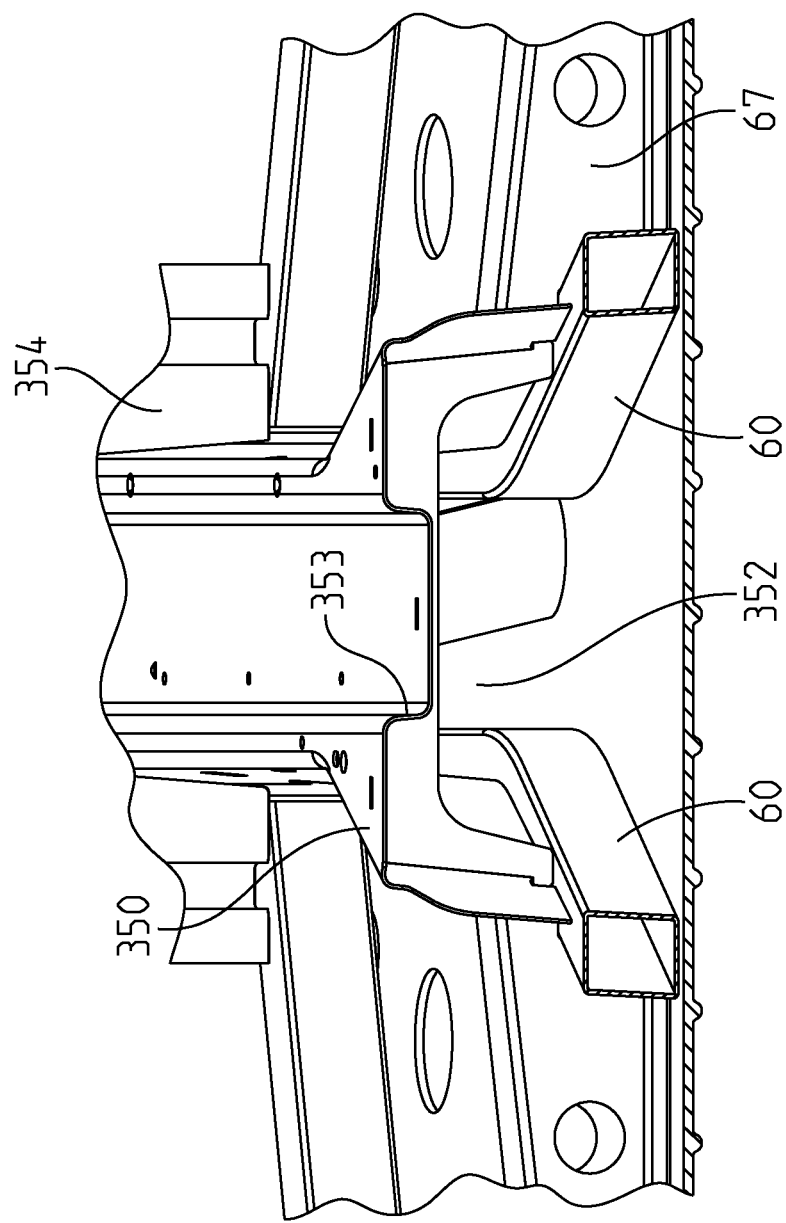
FIG. 18 is a cross sectional view through lines 18-18 of FIG. 9.

With reference now to FIGS. 9 and 18, a channel member 350 is positioned over frame tubes 60 from a position from the front 50 of the vehicle to a position extending over truss member 67 defining an opening 352 (FIG. 18). The channel member 350 defines an opening or tunnel between the front of the vehicle to a position under the seats for receiving the drive shaft that extends from the rear of the vehicle to the front of the vehicle for driving a front differential. The channel member 350 is coupled to the main frame tubes 60, 62 to define a rigid member resistant to torsion. The top of the channel 350 defines a passageway 353 for receiving other essentials extending from the front of the vehicle to the rear of the vehicle, such as a wiring harness (lights, electronic throttle control wiring, etc), cooling tubes, brake lines, etc. As shown best in FIGS. 3 and 18, a shear plate 354 also extends upwardly from frames tubes 62 to upper frame portion 356 also provided to resist torsion to the vehicle frame 4. Shear plate 354 also allows for the mounting of accessories thereto.

Figure 19:
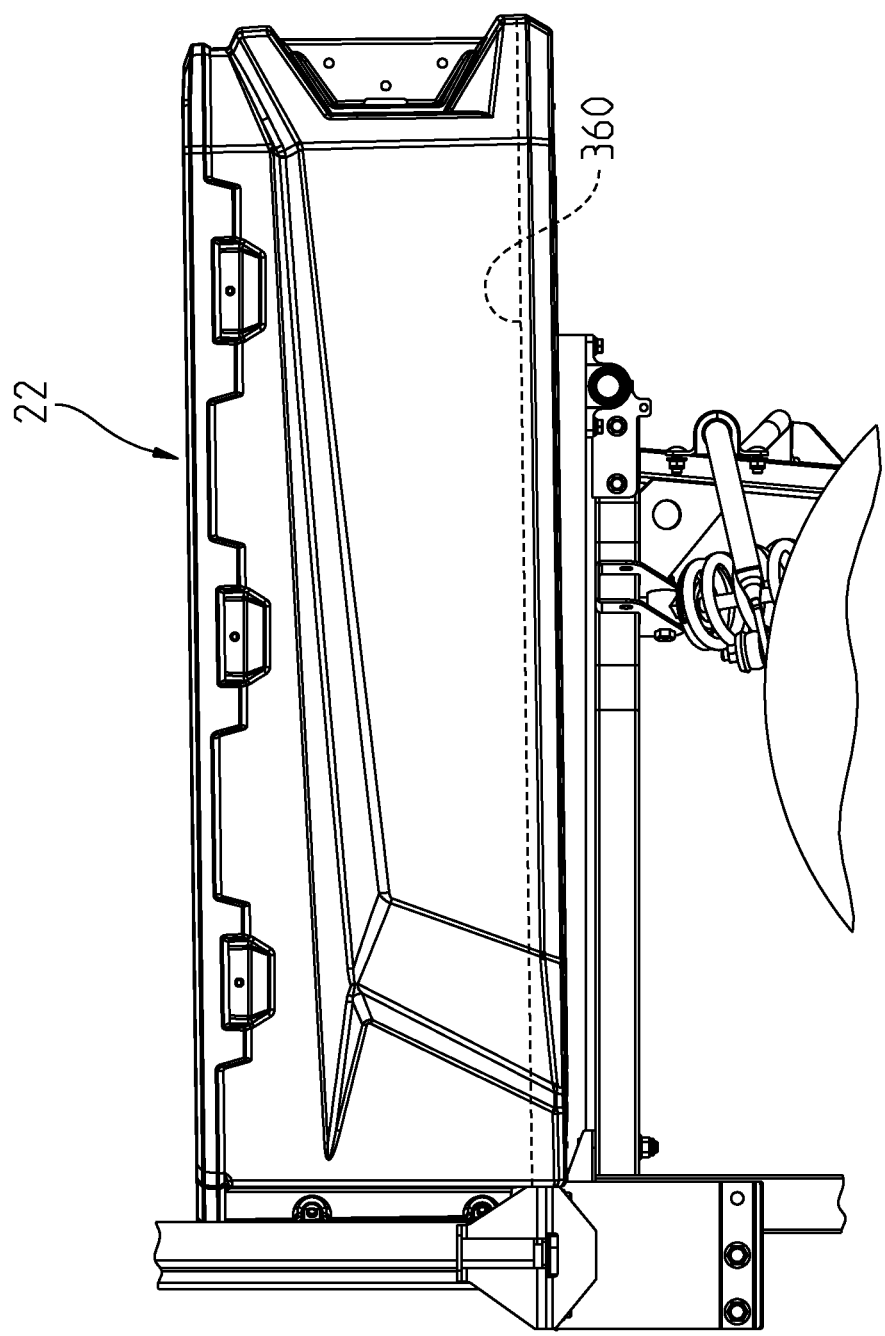
FIG. 19 shows a side view of the utility dump box.
Figure 20:
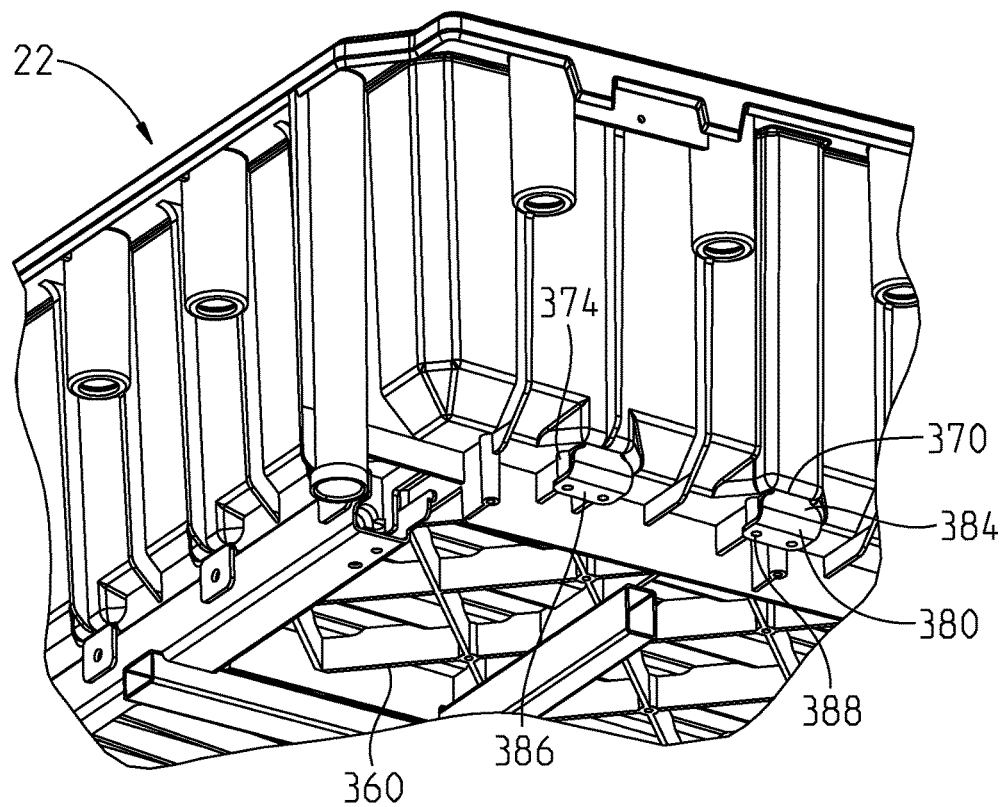
FIG. 20 shows an underside perspective view of a side of the utility dump box.
Figure 21:
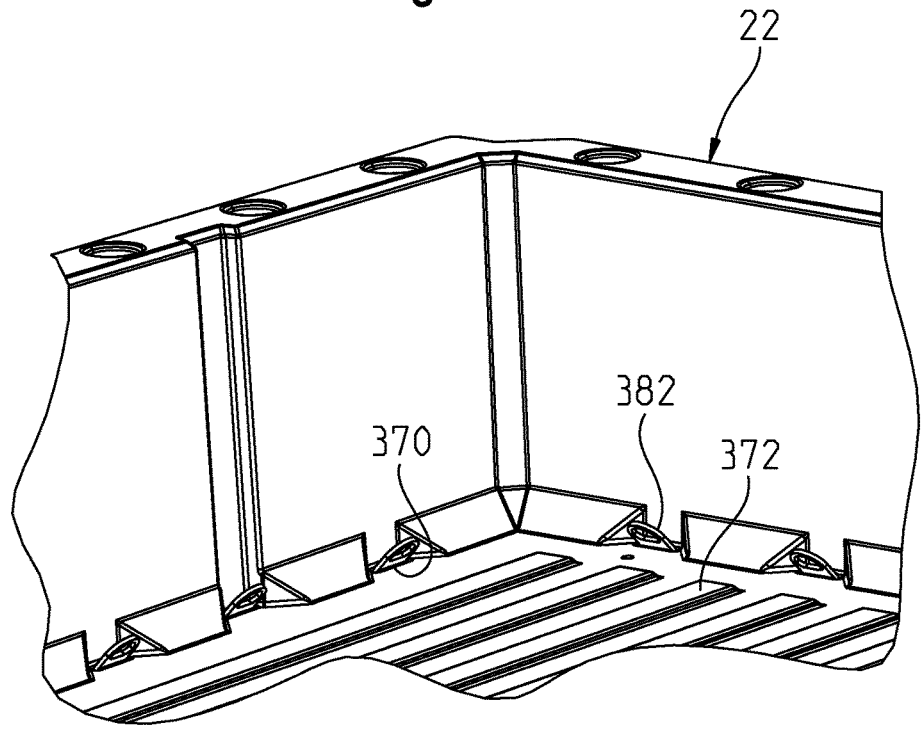
FIG. 21 shows integrated tie downs positioned in the utility dump box.
Figure 22:
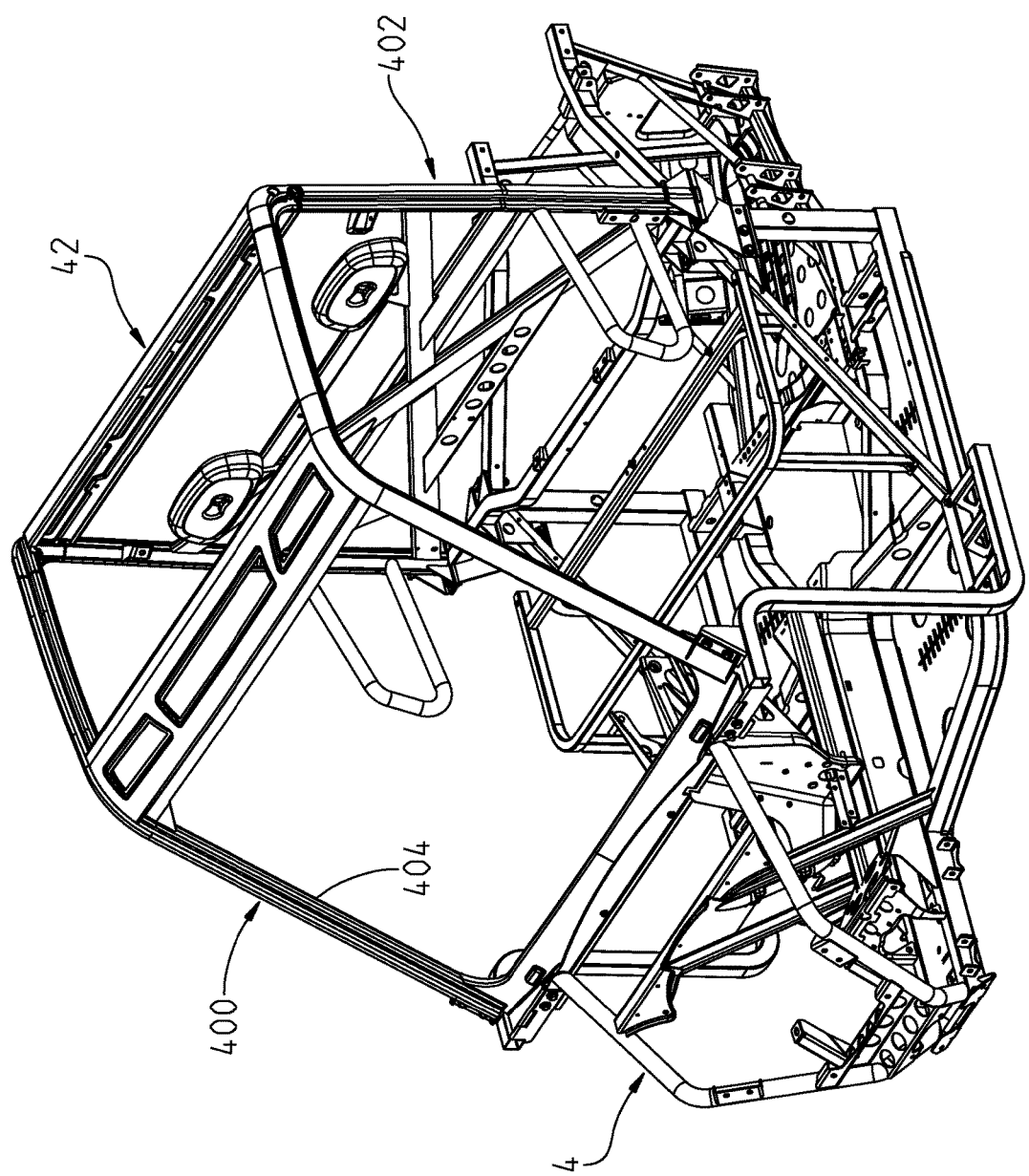
FIG. 22 is a left front perspective view of the roll cage attached to the frame.
Figure 23:
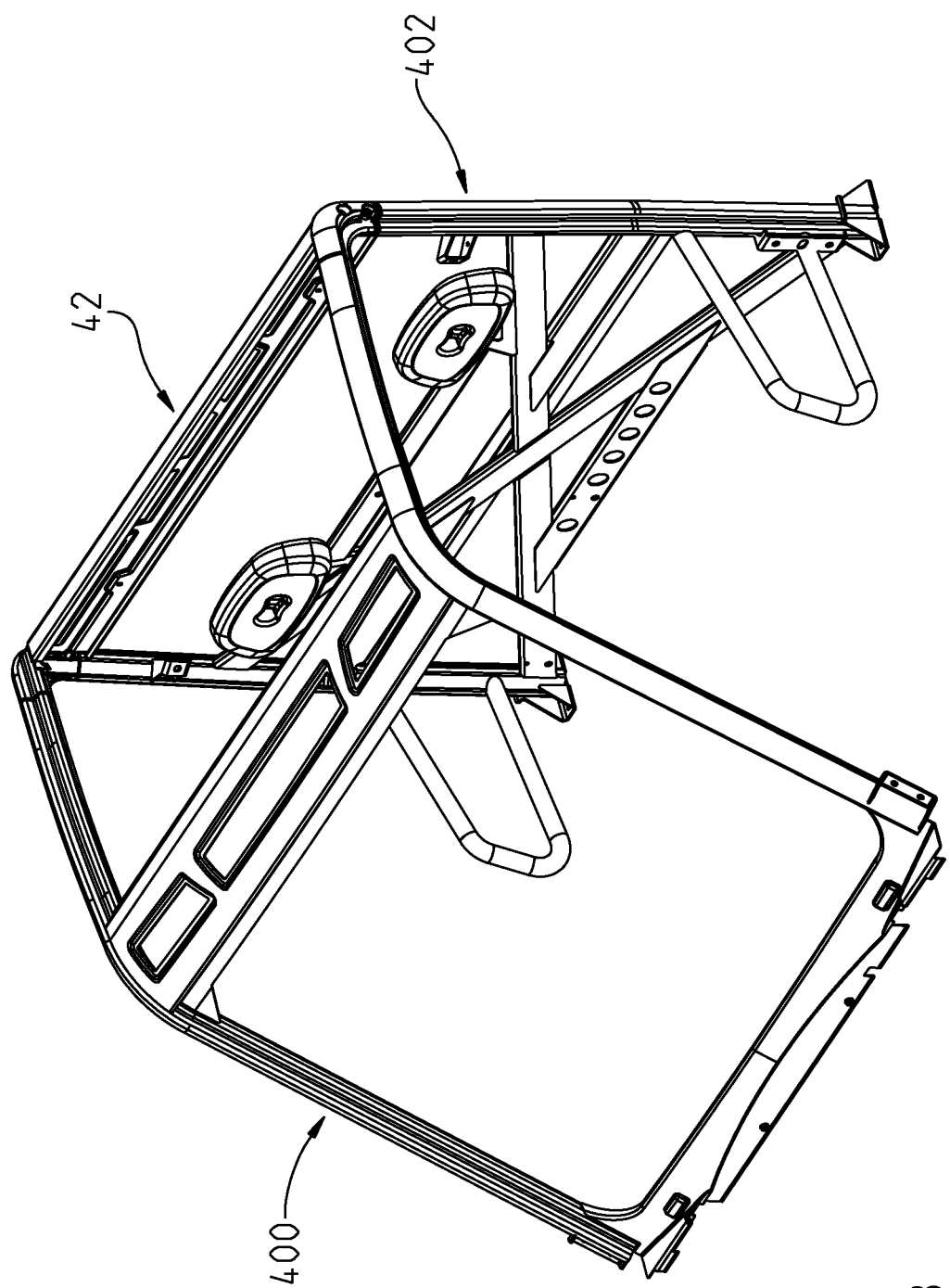
FIG. 23 is a left front perspective view of the roll cage.

With reference now to FIGS. 19-21, the rear utility box 22 is shown in greater detail. As shown in FIG. 19, the utility box 22 has an underside surface 360 which inclines upwardly and forwardly providing a small draft angled surface on the inside of the utility box. This provides for easier dumping of the contents of the utility box, as well as raises the inside surface of the utility box for clearance purposes due to the rearwardly adjusted engine 150 and transmission 152. Furthermore as shown in FIG. 21, the side edges of the utility box include a plurality of molded in slots 370 which extend downwardly through a floor 372 of the box, the slots extending outwardly of inwardly molded posts 374 (FIG. 20). Tie downs 380 are provided having an upwardly extending portion 382 for extending through slots 370, a shank portion 384 for extending downwardly through the slot, and a flange portion 386 for positioning against the post 374. Fasteners may be positioned through apertures 388 of the tie downs 382 fastening the tie downs to the utility box in a semi-fixed fashion. It should be understood that the tie downs may be positioned in alternate orientations as decided by the owner/user.

With reference now to FIGS. 22-26, the roll cage 50 will be described in greater detail. As shown, cage 50 includes a front cage portion 400 and a rear cage portion 402. As shown best in FIG. 24, front cage portion 400 includes upright portions 404, horizontal portions 406, crossbeam 408 and lower crossbeam 410. As defined, front cage portion 400 defines surfaces 412 of uprights 404, surface 414 of crossbeam 408 and surface 416 of lower crossbeam 410 all arranged in a plane for receiving an accessory windshield. In a like manner, surfaces 420 are defined on portions 406 and surface 422 is defined on overhead beam 408 to define a planar surface for receiving either an accessory overhead roof piece or see through moon roof. As shown, upright portions 404 include brackets 422 for connection to gussets 82 (FIG. 9). Finally, cage portion 400 includes rear connectors 424 for connection to rear cage portion 402 as described herein.

Figure 24:
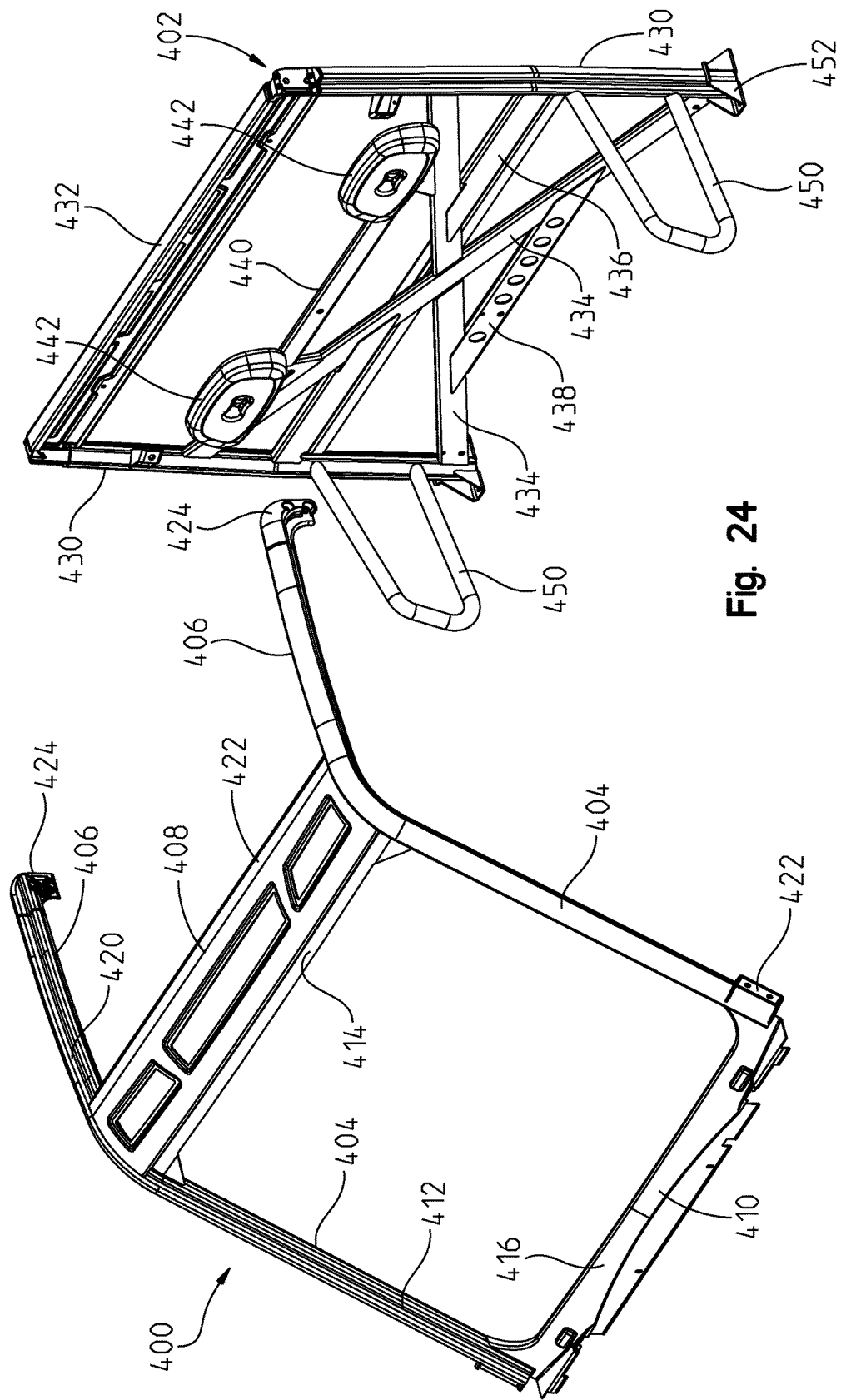
FIG. 24 shows the roll cage of FIG. 23 in an exploded fashion.
Figure 25:
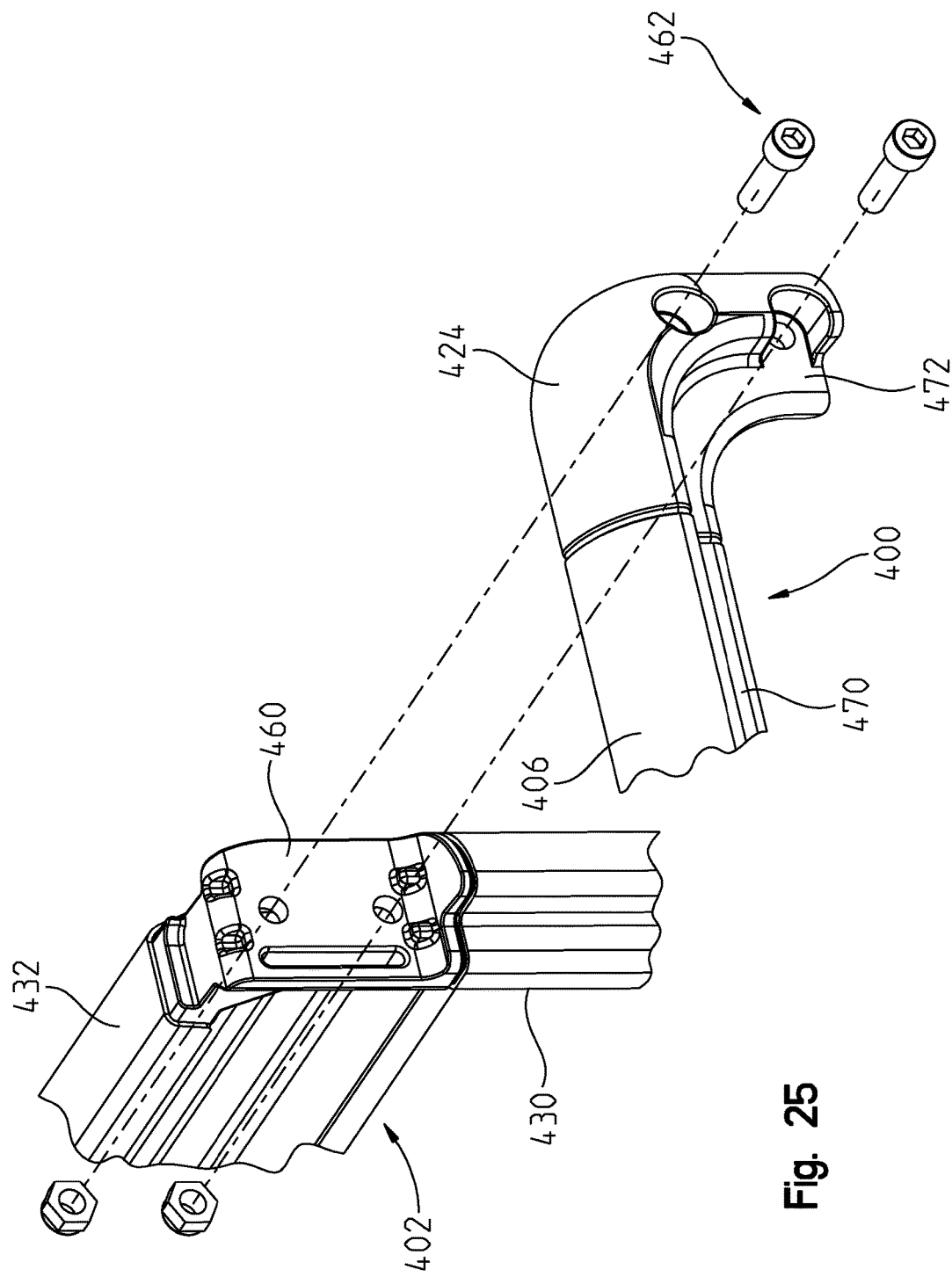
FIG. 25 shows an enlarged view of the connection points of the collapsible roll cage.
Figure 26:
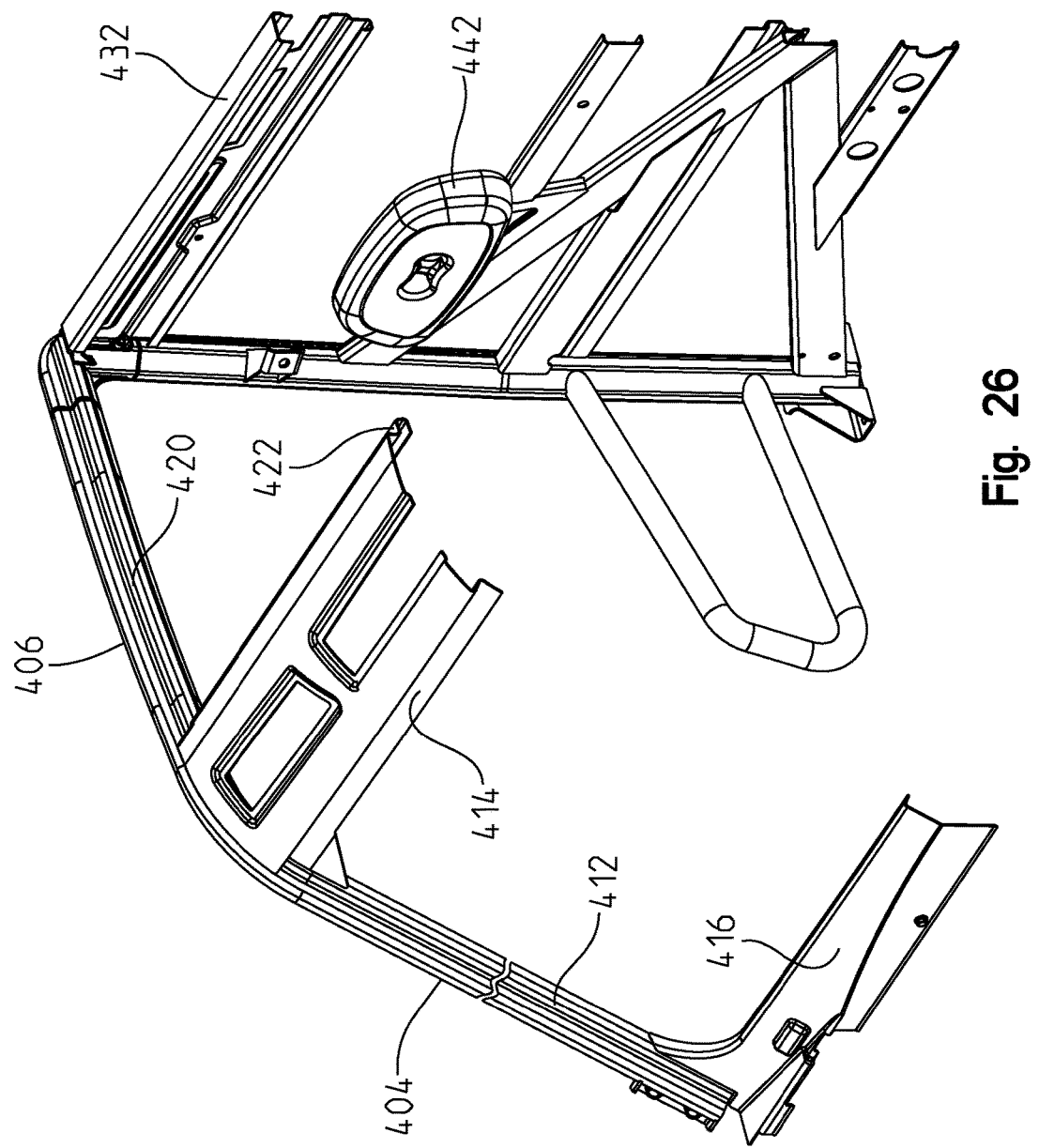
FIG. 26 shows a cross section of the roll cage showing the configuration of the components.
Figure 27:
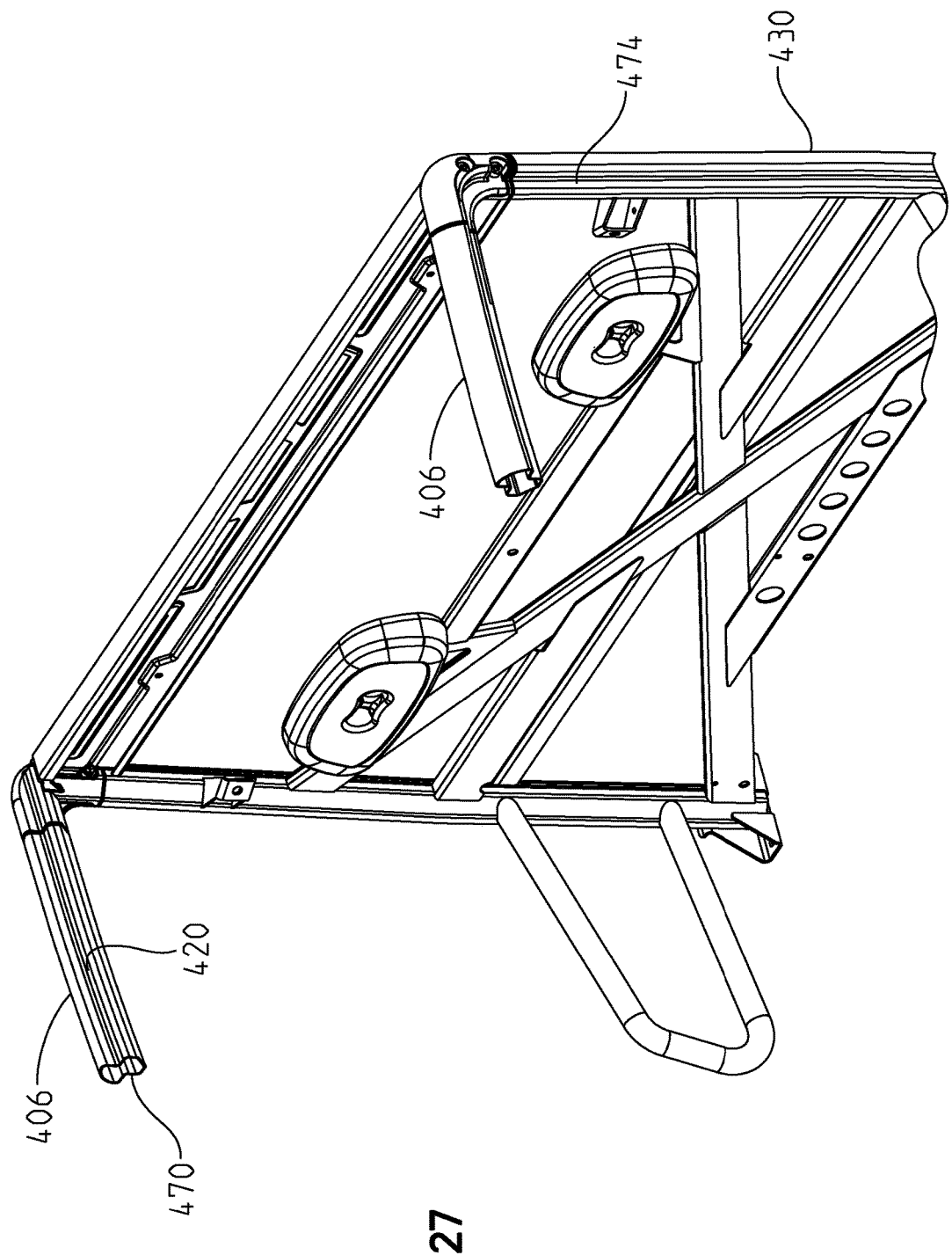
FIG. 27 shows a lateral cross section showing a cross section configuration of the lateral roll cage members.
Figure 31:
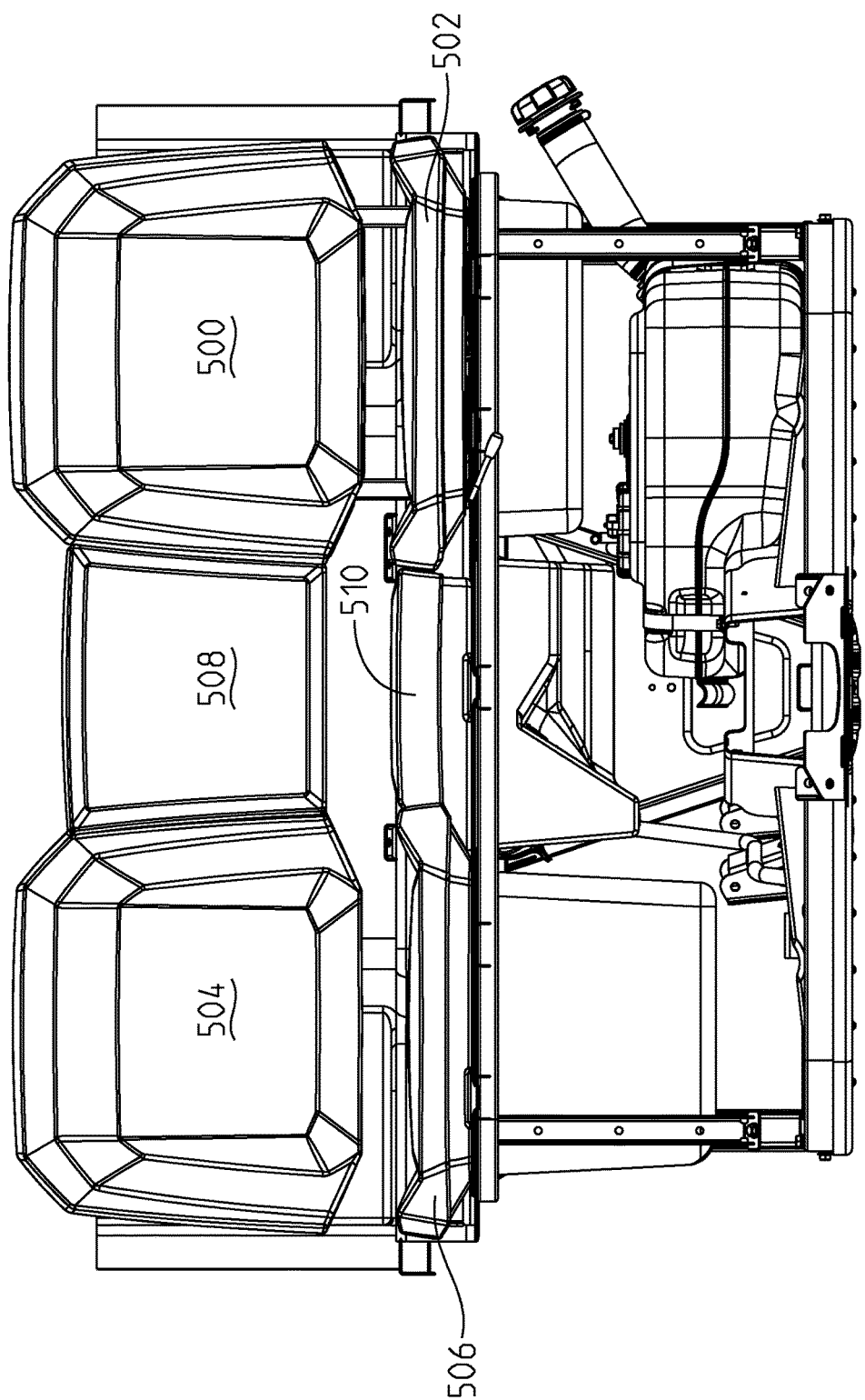
FIG. 31 is a front view of the seating assembly of FIG. 28.
Figure 32:
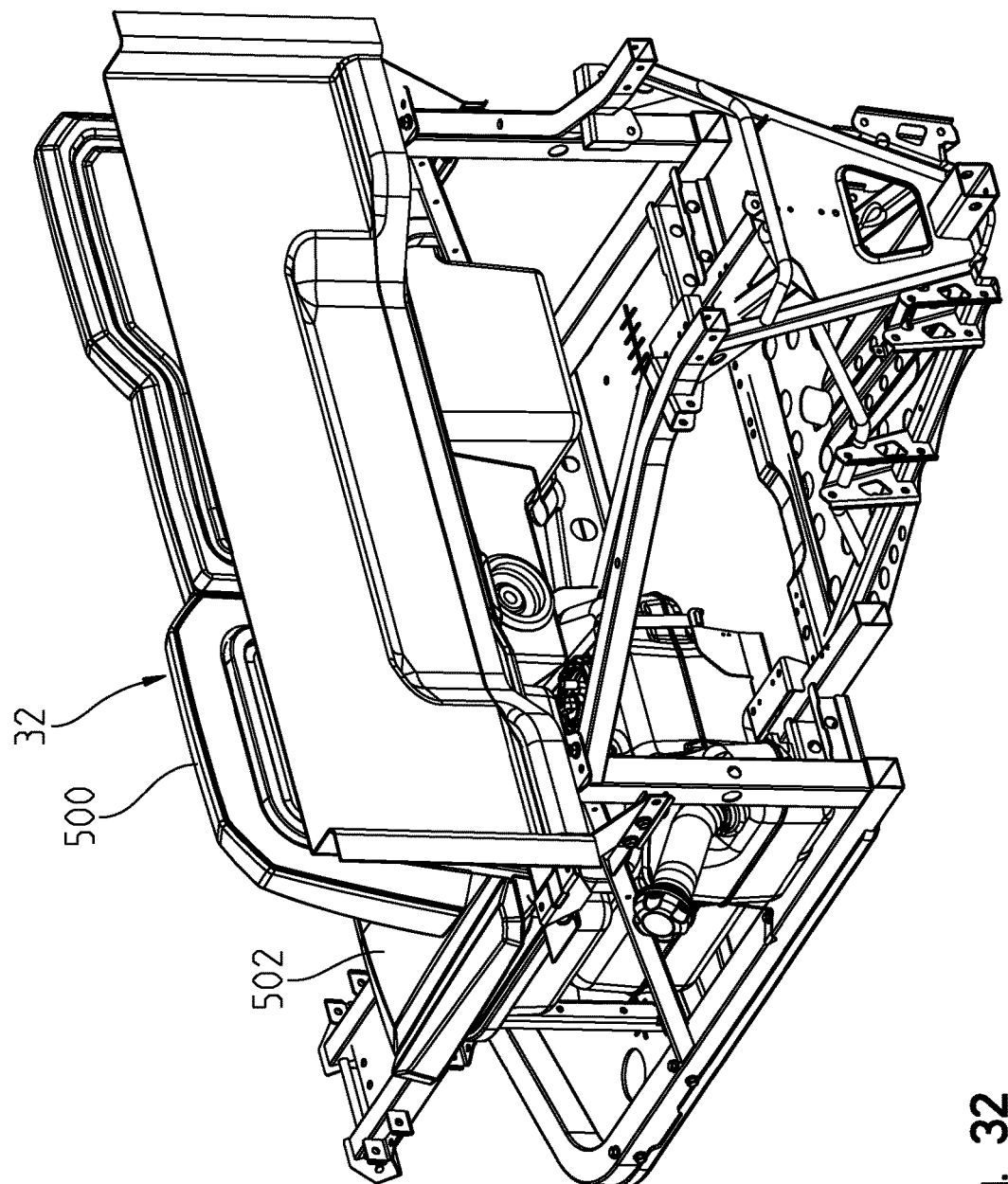
FIG. 32 is a left rear perspective view of the seating assembly of FIG. 28.

As shown best in FIG. 24, rear cage portion 402 includes uprights 430, cross member 432, diagonal braces 434, cross members 436 and 438 and cross member 440 retaining head rests 442. Side supports 450 extend forwardly from uprights 430. Rear portion 402 includes brackets 452 for attachment to upper flange 104 (FIG. 8). As shown best in FIG. 25, the intersection of upright 430 and cross member 432 defines a profile 460 for the receipt of connector 424. Thus, the front and rear cage portions 400, 402 are easily connectable by way of fasteners 462. As also shown in FIG. 25, cage portion 406 includes an outwardly facing surface or lip at 470 which is planar with a surface 472 on connector 424 and with surface 474 (FIG. 27) of rear upright 430. This allows for the addition of an accessory door. The exact configuration of the cross section of cage portion 406 is shown in FIG. 27 which is somewhat hourglass or a figure eight configuration.

With respect now to FIGS. 28-37, the seating assembly of the present disclosure will be described in greater detail. With reference first to FIG. 28, the seating assembly 32 is shown in an installed position in the seat frame 90. As shown, driver's seat 34 includes a seat back 500 and a seat bottom 502, passenger seat 36 includes a seat back 504 and a seat bottom 506; and center seat 38 includes a seat back 508 and a seat bottom 510.

Figure 33:
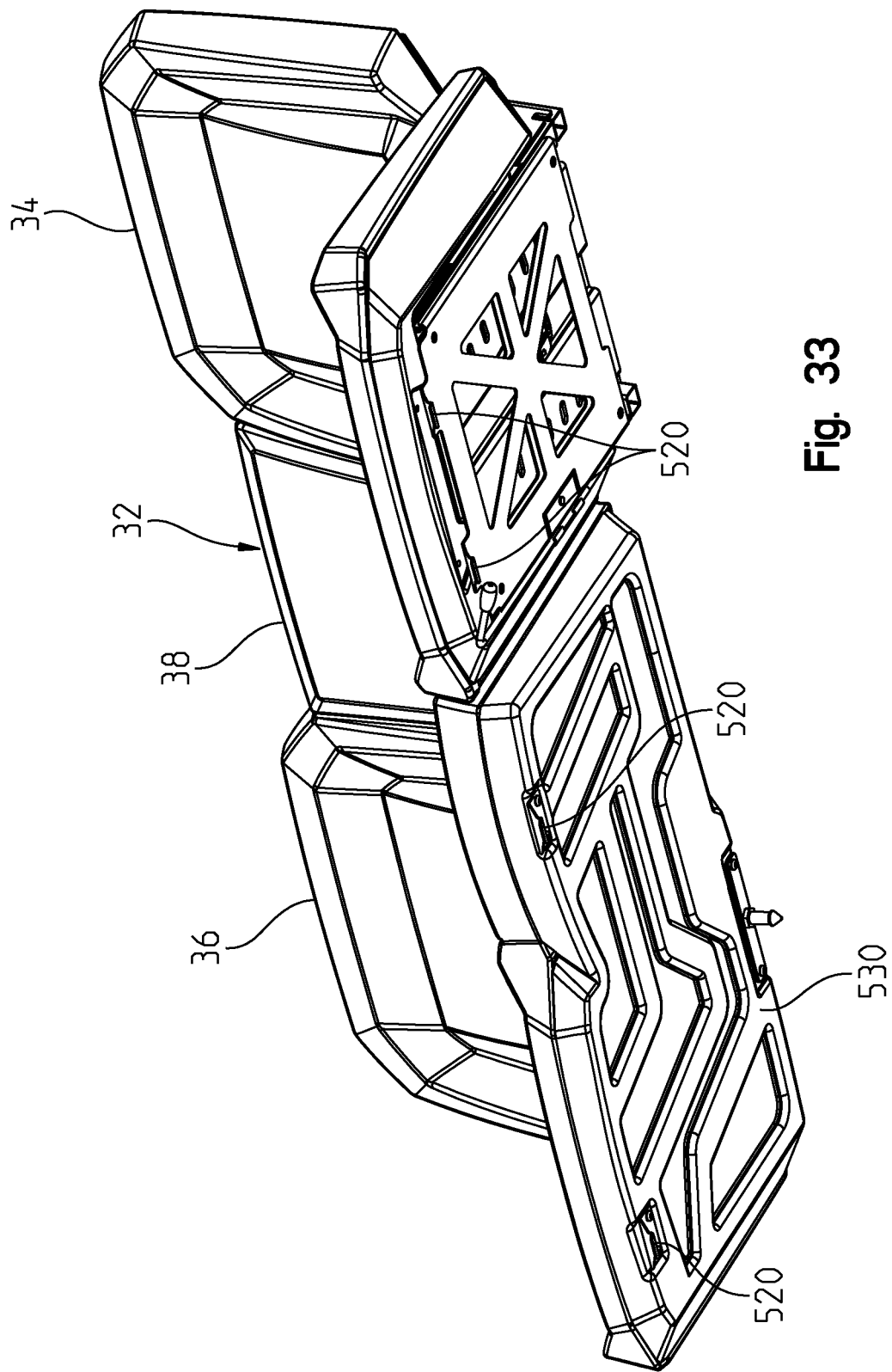
FIG. 33 is an underside perspective view of the seating assembly removed from the vehicle.
Figure 34:
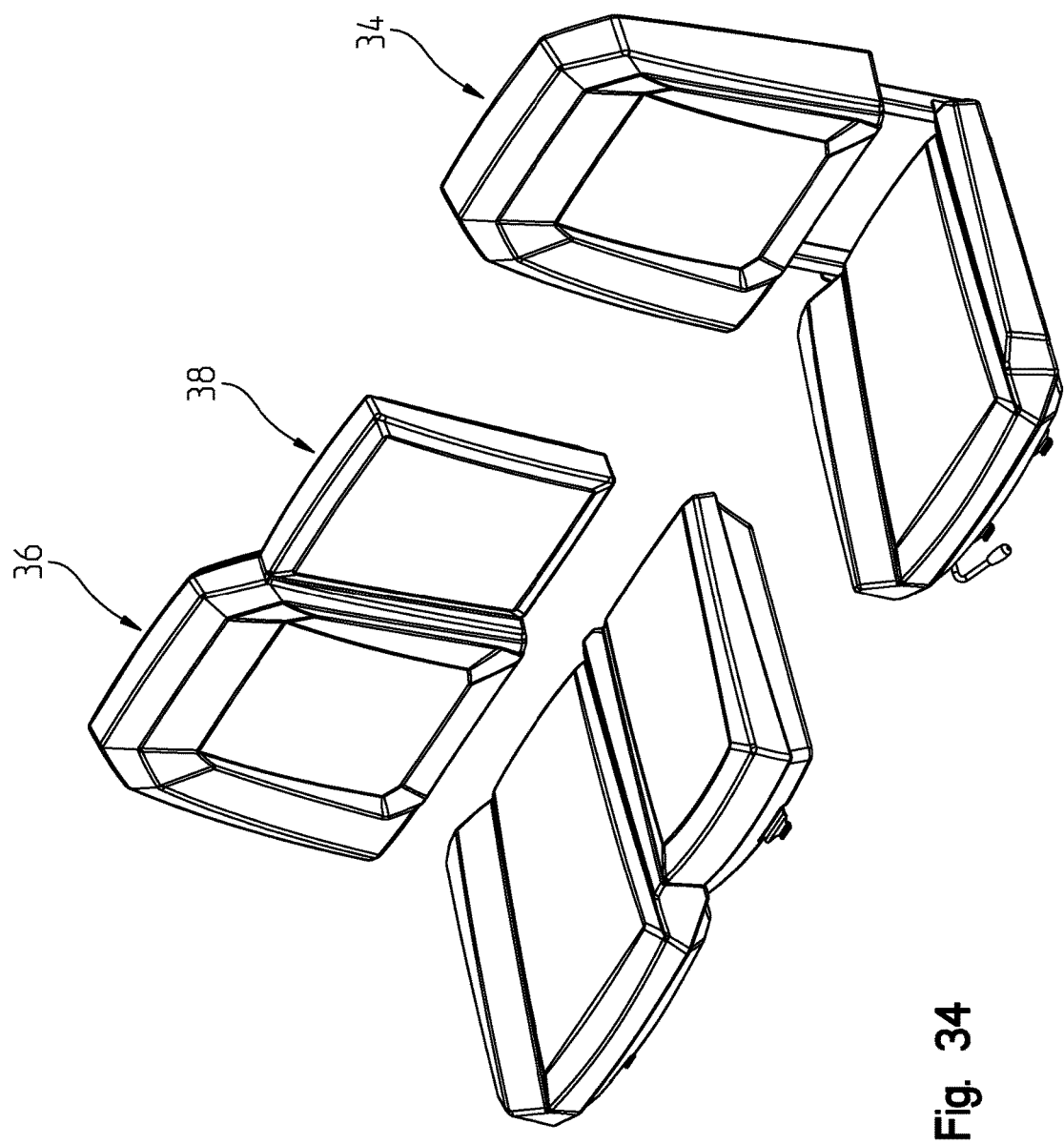
FIG. 34 shows the seating assembly of FIG. 33 exploded from one another.
Figure 35:
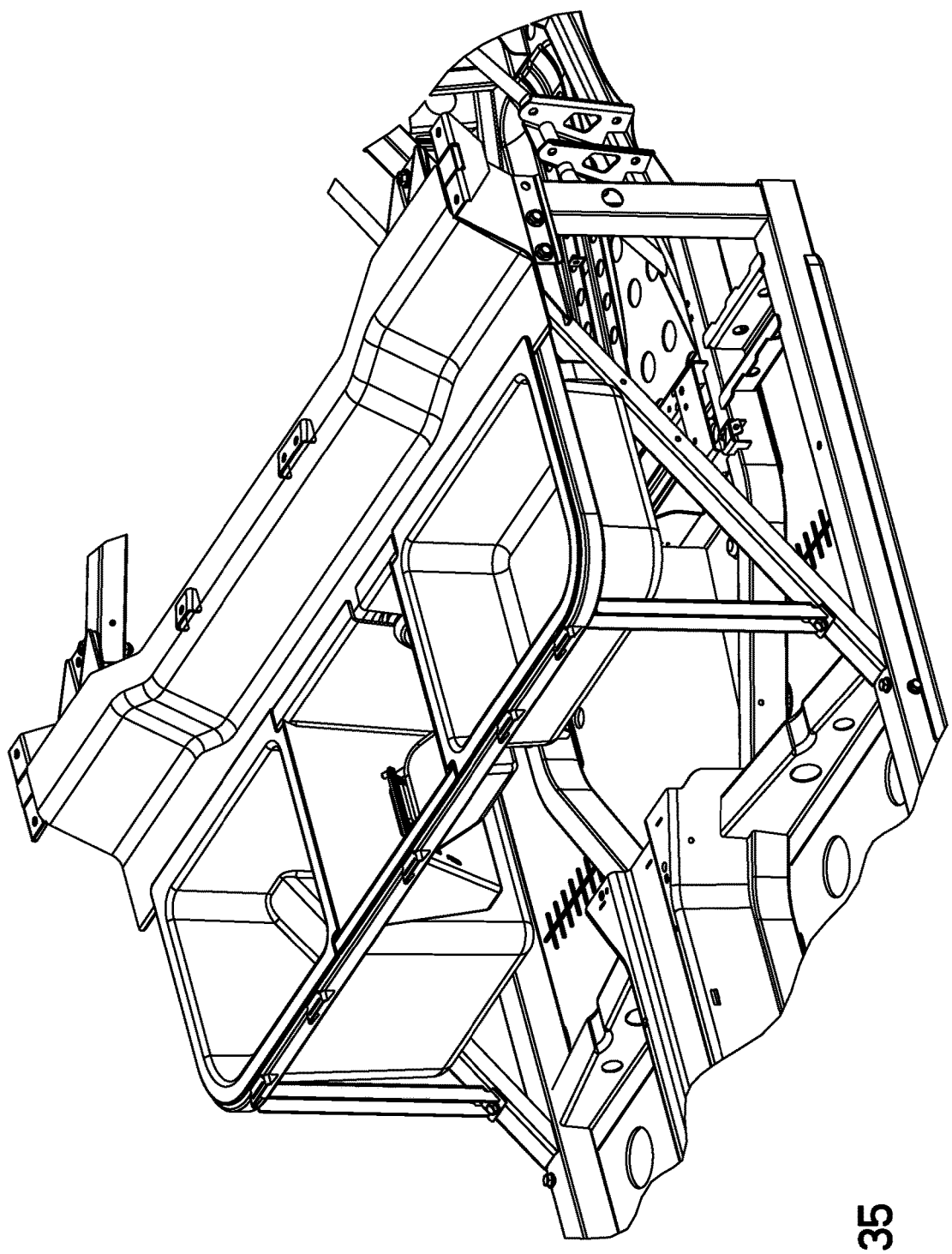
FIG. 35 shows the seat frame of the vehicle.
Figure 36:
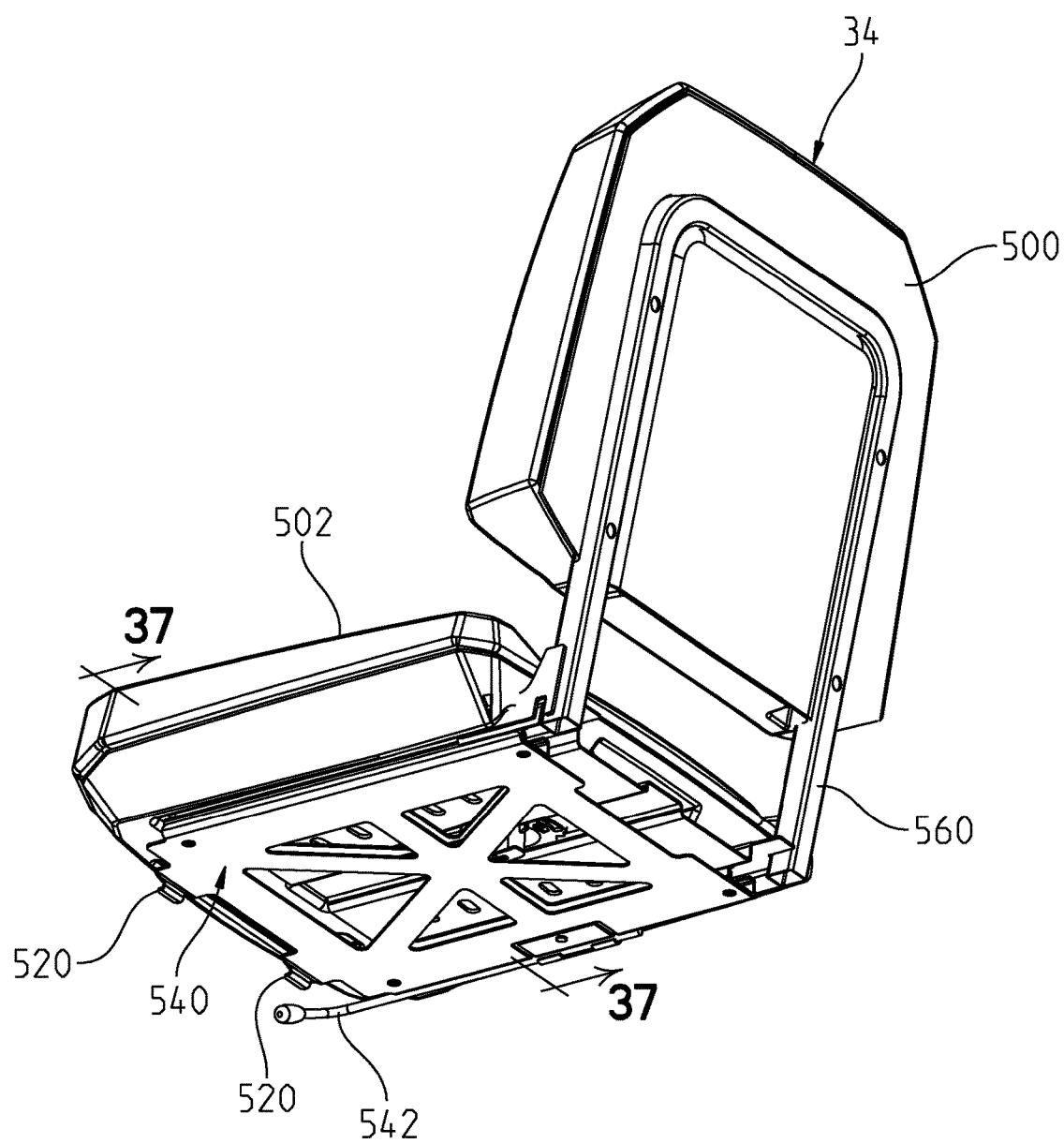
FIG. 36 shows an underside perspective view of the driver's seat.

As shown best in FIGS. 33, 34 and 36, the front edges of the seating assembly includes hooks 520 which are pivotally clipped into an opening 522 of a bracket 524 (FIG. 29) clipping the seats into the seat frame 90. It should be appreciated then that the seat can tip forward towards the steering wheel and/or the dash board of the vehicle for removal of the seats and for access to the storage bins under the seat.

As shown best in FIGS. 33 and 34, driver's seat 34 and the combined passenger seat 36 and center seat 38 are separate assemblies. As shown, the passenger seat 36 and center seat 38 would include a lower structural frame 530 upon which the seat bottom would be constructed, and to which hooks 520 would be assembled or integrated.

Figure 37:
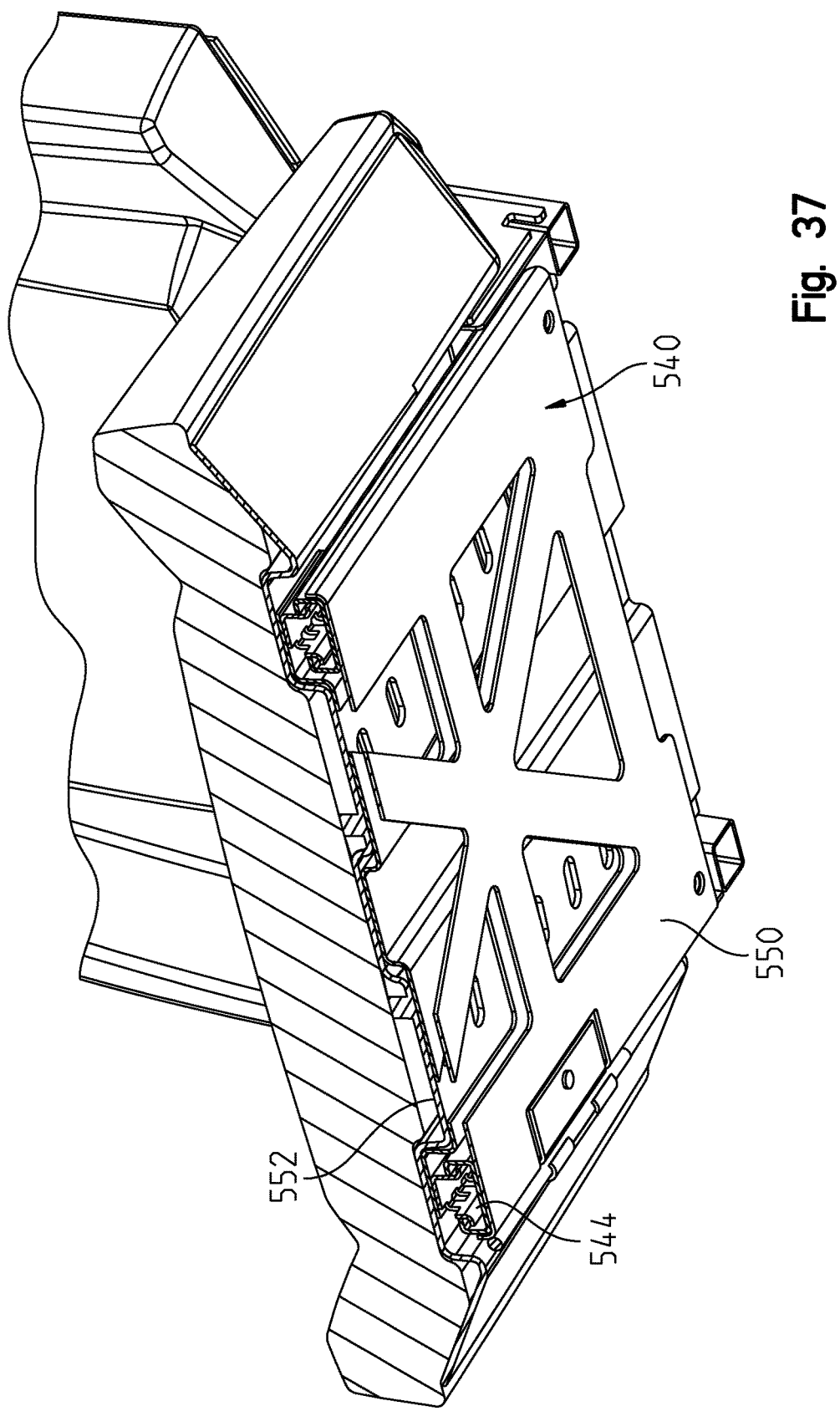
FIG. 37 shows a cross sectional view through lines 37-37 of FIG. 36.

As shown best in FIGS. 36 and 37, driver's seat 34 includes a lower slide assembly 540 to which hooks are provided. Seat 34 further includes an adjustment mechanism 542 as well as an inner slide track 544 (FIG. 37) allowing sliding movement between a lower track member 550 and an upper track member 552 of track assembly 540. Frame 560 of seat back 500 is attached to the lower track assembly 540, and thus when upper track portion 552 moves relative to lower track portion 550, seat back moves with seat bottom 502.

While the power source of the present disclosure is shown as a combustion engine, illustratively a combustion engine, the engine could also take on the form of a multi-fuel engine capable of utilizing various fuels. An exemplary multifuel engine capable of utilizing various fuels is disclosed in U.S. patent application Ser. No. 11/445,731 filed Jun. 2, 2006, (and counterpart PCT application number PCT/US07/70220), the disclosure of which is expressly incorporated by reference herein. In another embodiment, the power source could be a hybrid electric engine. In another embodiment, the power source could be an electric engine, where the spacing under the seats is utilized for the battery packs. An illustrative electric vehicle is shown in any one of assignee's applications, Ser. No. 12/484,921 filed Jun. 15, 2009 (and counterpart PCT application number PCT/US2010/38711) or Ser. No. 12/816,004 filed Dec. 16, 2010 the subject matter of which is incorporated herein by reference.

The vehicle could also include a range extender of the type disclosed in application Ser. No. 12/928,479 filed Dec. 13, 2010 (and counterpart PCT application number PCT/US2010/049167).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

The invention claimed is:

1. A side by side vehicle, comprising:
a vehicle frame comprising main frame tubes extending generally longitudinally;
a vehicle seat frame positioned in a mid portion of the frame, and positioned at a raised position relative to the frame tubes;
a powertrain positioned rearward of the vehicle seat frame and coupled to the vehicle frame;
side by side seats supported by the seat frame; and
one or more storage units positioned under the side by side seats.

2. The vehicle of claim 1, wherein the seats are movable to access the one or more storage units under the side by side seats.

3. The vehicle of claim 2, wherein the seats are pivotally movable to access the one or more storage units.

4. The vehicle of claim 3, wherein the side by side seats comprise a driver seat, a passenger seat and a center seat.

5. The vehicle of claim 4, wherein the driver seat is approximately 40% of the width of the side by side seats, and the passenger seat and center seat is approximately 60% of the width of the side by side seats.

6. The vehicle of claim 4, wherein the driver seat moves forwardly and backwardly relative to the passenger seat and center seat.

7. The vehicle of claim 3, wherein the side by side seats comprise seat backs and seat bottoms, and the side by side seats pivot forward about the seat bottoms to expose the storage units.

8. The vehicle of claim 1, wherein a fuel tank is positioned beneath one of the passenger seat or driver seat.

9. The vehicle of claim 8, wherein a battery is positioned beneath the other of the passenger seat or driver seat.

10. The vehicle of claim 9, wherein the storage units extend from a position beneath the side by side seats to the battery and fuel tank.

11. The vehicle of claim 10, further comprising a storage bin beneath the center seat.

12. The vehicle of claim 11, wherein the storage bin beneath the center seat houses the electronic assembly of the vehicle.

13. The vehicle of claim 12, wherein the electronic assembly of the vehicle comprises an engine control module.

14. A side by side vehicle, comprising:
a vehicle frame extending generally longitudinally;
a vehicle seat frame positioned in a mid portion of the frame, and positioned at a raised position relative to the frame tubes;
a powertrain positioned rearward of the vehicle seat frame and coupled to the vehicle frame;
side by side seats supported by the seat frame; and
a rear suspension comprising at least one rear alignment arm coupled to each side of a rear of the vehicle frame, the alignment arms being coupled to the vehicle frame at front and rear connection points, wherein a distance between the front connection points is greater than a distance between the rear connection points, and wherein at least a portion of the powertrain is positioned between the front connection points of the alignment arms.

15. The vehicle of claim 14, wherein the connection points of the alignment arms are positioned along lines of rotation relative to a longitudinal axis of the vehicle, and the lines of rotation are at an acute angle relative to the longitudinal axis.

16. The vehicle of claim 15, wherein the alignment arms are defined by upper and lower alignment arms and a wheel hub connects the two upper and lower alignment arms.

17. The vehicle of claim 16, wherein the alignment arms are defined as generally rectangular, with the hubs attached to a front outside corner of the alignment arms.

18. The vehicle of claim 17, wherein the alignment arms extend outwardly and rearwardly from the frame at an acute angle.

19. The vehicle of claim 18, wherein the hubs are skewed relative to the alignment arms and extend outwardly at an angle transverse to the longitudinal axis.

20. The vehicle of claim 14, wherein a prop shaft is connected between the hubs and a differential.

21. The vehicle of claim 20, wherein the prop shafts extend rearwardly.

22. The vehicle of claim 21, wherein a shock absorber is coupled to the lower alignment arm.

23. The vehicle of claim 22, wherein the shock absorber is positioned rearward of the prop shaft.

24. The vehicle of claim 20, further comprising a torsion bar coupled to the lower alignment arm.

25. The vehicle of claim 24, wherein the torsion bar comprises a transverse bar portion and longitudinal bar portions, and in that the transverse bar portion extend rearwardly of the shock absorber and the longitudinal bar portions extending forwardly and outside of the shock absorbers.

26. The vehicle of claim 25, wherein the torsion bar is coupled to the lower alignment arm.

27. The vehicle of claim 26, wherein a link arm extends downwardly from each longitudinal bar portion, and couples to the lower alignment arm.

28. The vehicle of claim 27, wherein the link arm and the shock absorber are coupled together at the lower end thereof.

29. A side by side vehicle, comprising:
a vehicle frame;
a vehicle seat frame positioned in a mid portion of the frame, and positioned at a raised position relative to the frame tubes;
a powertrain positioned rearward of the vehicle seat frame and coupled to the vehicle frame;
side by side seats supported by the seat frame;
one or more storage units positioned under the side by side seats; and
a rear suspension having at least one first connection point to the frame, wherein at least a portion of the powertrain is positioned rearward of the first connection point.

30. The vehicle of claim 29, comprising at least one rear alignment arm coupled to each side of a rear of the vehicle frame, wherein the first connection point is a front connection point of the alignment arm.

31. The vehicle of claim 30, wherein the alignment arms are coupled to the vehicle frame at first and second connection points, wherein the second connection point is rearward of the first connection point.

32. The vehicle of claim 31, wherein a distance between the front connection points is greater than a distance between the rear connection points, and wherein at least a portion of the powertrain is positioned between the front connection points of the alignment arms.

33. The vehicle of claim 30, wherein the seats are movable to access the one or more storage units under the side by side seats.

34. The vehicle of claim 33, wherein the seats are pivotally movable to access the one or more storage units.

35. The vehicle of claim 34, wherein the side by side seats comprise a driver seat, a passenger seat and a center seat.

36. The vehicle of claim 35, wherein the driver seat is approximately 40% of the width of the side by side seats, and the passenger seat and center seat is approximately 60% of the width of the side by side seats.

37. The vehicle of claim 35, wherein the driver seat moves forwardly and rearwardly relative to the passenger seat and center seat.

38. The vehicle of claim 30, wherein the side by side seats comprise seat backs and seat bottoms, and the side by side seats pivot forward about the seat bottoms to expose the storage units.

39. The vehicle of claim 30, wherein a fuel tank is positioned beneath one of the passenger seat or driver seat.

40. The vehicle of claim 39, wherein a battery is positioned beneath the other of the passenger seat or driver seat.

41. The vehicle of claim 40, wherein the storage units extend from a position beneath the side by side seats to the battery and fuel tank.

42. The vehicle of claim 41, wherein the storage bin houses an electronic assembly of the vehicle.

43. The vehicle of claim 42, wherein the electronic assembly of the vehicle comprises an engine control module.

44. A side by side vehicle, comprising:
a vehicle frame;
a vehicle seat frame positioned in a mid portion of the frame, and positioned at a raised position relative to the frame tubes;
a powertrain positioned rearward of the vehicle seat frame and coupled to the vehicle frame;
side by side seats supported by the seat frame;
at least one storage unit positioned under the side by side seats; and wherein the storage bin houses an electronic assembly of the vehicle.

45. The vehicle of claim 44, wherein the electronic assembly of the vehicle comprises an engine control module.

46. The vehicle of claim 44, further comprising a rear suspension having at least one first connection point coupled to the frame, wherein at least a portion of the powertrain is positioned rearward of the first connection point.

47. The vehicle of claim 46, wherein the suspension comprises at least one rear alignment arm coupled to each side of a rear of the vehicle frame, wherein the first connection point is a front connection point of the alignment arm.

48. The vehicle of claim 47, wherein the alignment arms are coupled to the vehicle frame at first and second connection points, wherein the second connection point is rearward of the first connection point.

49. The vehicle of claim 48, wherein a distance between the front connection points is greater than a distance between the rear connection points, and wherein at least a portion of the powertrain is positioned between the front connection points of the alignment arms.

50. The vehicle of claim 44, wherein the seats are movable to access the one or more storage units under the side by side seats.

51. The vehicle of claim 50, wherein the seats are pivotally movable to access the one or more storage units.

52. The vehicle of claim 44, wherein a fuel tank is positioned beneath one of a passenger seat and driver seat.

53. The vehicle of claim 52, wherein a battery is positioned beneath the other of the passenger seat or driver seat.

54. The vehicle of claim 53, wherein the storage units extend from a position beneath the side by side seats to the battery and fuel tank.

* * * * *